(12) United States Patent
Way et al.

(10) Patent No.: US 7,499,647 B2
(45) Date of Patent: Mar. 3, 2009

(54) FULLY PROTECTED BROADCAST AND SELECT ALL OPTICAL NETWORK

(75) Inventors: Winston Way, Irvine, CA (US); Chao Xiang Shi, Cupertino, CA (US)

(73) Assignee: OpVista Incorporated, Milpitas, CA (US)

( * ) Notice: Subject to any disclaimer, the term of this patent is extended or adjusted under 35 U.S.C. 154(b) by 1 day.

(21) Appl. No.: 10/338,088

(22) Filed: Jan. 6, 2003

(65) Prior Publication Data

US 2003/0180047 A1 Sep. 25, 2003
US 2006/0275034 A9 Dec. 7, 2006

Related U.S. Application Data

(63) Continuation-in-part of application No. 09/990,196, filed on Nov. 21, 2001, now Pat. No. 6,895,184, and a continuation-in-part of application No. 09/575,811, filed on May 22, 2000, now Pat. No. 6,525,857.

(60) Provisional application No. 60/346,786, filed on Jan. 7, 2002.

(51) Int. Cl.
*H04J 14/00* (2006.01)
(52) U.S. Cl. .................................. 398/3; 398/59
(58) Field of Classification Search .................. 398/3, 398/4, 59, 83, 84, 85, 87
See application file for complete search history.

(56) References Cited

U.S. PATENT DOCUMENTS 5,062,684 A 11/1991 Clyton et al.
5,101,450 A 3/1992 Olshansky .................. 38/5

(Continued)

FOREIGN PATENT DOCUMENTS

DE 198 28 614 12/1999

(Continued)

OTHER PUBLICATIONS

Winston Way; *Subcarrier Multiplexed Lightwave System Design Considerations for Subscriber Loop Applications*; Journal of Lightwave Technology, vol. 7, No. 11, Nov. 1989, pp. 1806-1818.

(Continued)

*Primary Examiner*—Christina Y Leung
(74) *Attorney, Agent, or Firm*—Fish & Richardson P.C.

(57) ABSTRACT

An all optical network for optical signal traffic provides at least a first ring with at least a first clockwise fiber, a second counter-clockwise fiber and a plurality of network nodes. Each node has at least a WDM transponder that with a line-side transmitter and a client-side receiver in a first direction, and a line-side receiver and a client-side transmitter in an opposing second direction. The line-side receiver includes a fixed or a tunable optical wavelength filter. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. If there are multiple WDM transponders, their wavelengths are added to the ring either in series or in parallel. All wavelengths dropped from the ring are selected by each individual WDM transponder in a parallel or serial manner.

47 Claims, 22 Drawing Sheets

U.S. PATENT DOCUMENTS

| | | | |
|---|---|---|---|
| 5,239,401 A | 8/1993 | Olshansky | |
| 5,301,058 A | 4/1994 | Olshansky | 398/194 |
| 5,333,000 A | 7/1994 | Hietala et al. | |
| 5,390,188 A | 2/1995 | Dawson et al. | |
| 5,442,623 A | 8/1995 | Wu | |
| 5,479,082 A | 12/1995 | Calvani et al. | |
| 5,509,093 A | 4/1996 | Miller et al. | |
| 5,539,559 A | 7/1996 | Cisneros et al. | |
| 5,546,210 A | 8/1996 | Chraplyvy et al. | |
| 5,596,436 A | 1/1997 | Sargis et al. | 398/76 |
| 5,600,466 A | 2/1997 | Tsushima et al. | |
| 5,608,825 A * | 3/1997 | Ip | 385/24 |
| 5,617,233 A | 4/1997 | Boncek | |
| 5,625,478 A * | 4/1997 | Doerr et al. | 398/4 |
| 5,663,820 A | 9/1997 | Shiragaki | |
| 5,680,235 A | 10/1997 | Johansson | |
| 5,696,614 A | 12/1997 | Ishikawa et al. | |
| 5,710,650 A | 1/1998 | Dugan | |
| 5,712,716 A | 1/1998 | Vanoli et al. | |
| 5,717,795 A | 2/1998 | Sharma et al. | |
| 5,734,493 A | 3/1998 | Jopson | 359/326 |
| 5,742,416 A | 4/1998 | Mizrahi | |
| 5,745,273 A | 4/1998 | Jopson | |
| 5,764,821 A | 6/1998 | Glance | |
| 5,778,118 A | 7/1998 | Sridhar | |
| 5,781,327 A | 7/1998 | Brock et al. | |
| 5,784,184 A | 7/1998 | Alexander et al. | |
| 5,786,913 A | 7/1998 | Pfeiffer | |
| 5,796,501 A | 8/1998 | Sotom et al. | |
| 5,822,095 A | 10/1998 | Taga et al. | |
| 5,838,475 A | 11/1998 | Takeyari et al. | |
| 5,870,212 A | 2/1999 | Nathan et al. | |
| 5,880,870 A | 3/1999 | Sieben et al. | |
| 5,896,212 A | 4/1999 | Sotom et al. | |
| 5,917,638 A | 6/1999 | Franck et al. | |
| 5,923,449 A | 7/1999 | Doerr et al. | |
| 5,938,309 A | 8/1999 | Taylor | |
| 5,940,197 A | 8/1999 | Ryu | |
| 5,949,273 A | 9/1999 | Mourick et al. | |
| 5,949,560 A | 9/1999 | Roberts et al. | |
| 5,953,141 A | 9/1999 | Liu et al. | |
| 5,982,518 A | 11/1999 | Mizarahi | |
| 5,982,963 A | 11/1999 | Feng et al. | |
| 6,008,931 A | 12/1999 | Von Helmolt et al. | 359/326 |
| 6,023,359 A | 2/2000 | Asahi | |
| 6,035,080 A | 3/2000 | Henry et al. | |
| 6,069,732 A | 5/2000 | Koch et al. | |
| 6,084,694 A | 7/2000 | Milton et al. | |
| 6,088,141 A | 7/2000 | Merli et al. | |
| 6,118,566 A | 9/2000 | Price | 398/194 |
| 6,130,766 A | 10/2000 | Cao | |
| 6,163,553 A | 12/2000 | Pfeiffer | 372/6 |
| 6,191,854 B1 * | 2/2001 | Grasso et al. | 356/341 |
| 6,192,173 B1 | 2/2001 | Solheim et al. | |
| 6,195,186 B1 | 2/2001 | Asahi | |
| 6,195,351 B1 | 2/2001 | Hiscock et al. | |
| 6,201,909 B1 | 3/2001 | Kewitsch et al. | |
| 6,208,441 B1 | 3/2001 | Jones et al. | |
| 6,211,980 B1 | 4/2001 | Terahara | |
| 6,222,654 B1 | 4/2001 | Frigo | |
| 6,259,836 B1 | 7/2001 | Dodds | |
| 6,271,946 B1 | 8/2001 | Chang et al. | |
| 6,285,479 B1 | 9/2001 | Okazaki et al. | |
| 6,339,663 B1 | 1/2002 | Leng et al. | |
| 6,351,323 B1 | 2/2002 | Onaka et al. | |
| 6,369,923 B1 | 4/2002 | Kuo et al. | |
| 6,385,204 B1 | 5/2002 | Hoefelmeyer et al. | |
| 6,404,535 B1 | 6/2002 | Leight | |
| 6,414,765 B1 * | 7/2002 | Li et al. | 398/5 |
| 6,433,904 B1 | 8/2002 | Swanson et al. | |
| 6,466,342 B1 | 10/2002 | Frigo et al. | |
| 6,525,857 B1 | 2/2003 | Way et al. | 398/192 |
| 6,556,744 B1 * | 4/2003 | Brimacombe et al. | 385/24 |
| 6,560,252 B1 | 5/2003 | Colbourne et al. | |
| 6,580,537 B1 | 6/2003 | Chang et al. | |
| 6,590,681 B1 * | 7/2003 | Egnell et al. | 398/82 |
| 6,657,952 B1 | 12/2003 | Shiragaki et al. | |
| 6,661,976 B1 | 12/2003 | Gnauck et al. | |
| 6,701,085 B1 * | 3/2004 | Muller | 398/4 |
| 6,788,899 B2 | 9/2004 | Way | |
| 6,891,981 B2 | 5/2005 | Price et al. | |
| 6,895,184 B2 | 5/2005 | Way | |
| 6,970,655 B2 | 11/2005 | Ono et al. | |
| 7,003,231 B2 | 2/2006 | Way et al. | |
| 7,024,112 B2 | 4/2006 | Way | |
| 7,068,949 B2 | 6/2006 | Jung et al. | |
| 7,120,359 B2 | 10/2006 | Way | |
| 7,206,520 B2 | 4/2007 | Way et al. | |
| 2002/0012148 A1 | 1/2002 | Oksanen | |
| 2002/0015553 A1 | 2/2002 | Claringburn et al. | |
| 2002/0023170 A1 | 2/2002 | Seaman et al. | |
| 2002/0030877 A1 | 3/2002 | Way et al. | |
| 2002/0063928 A1 | 5/2002 | Hansen et al. | |
| 2002/0067523 A1 | 6/2002 | Way | |
| 2002/0080440 A1 * | 6/2002 | Li et al. | 359/110 |
| 2002/0114034 A1 | 8/2002 | Way | |
| 2002/0126350 A1 * | 9/2002 | Sato et al. | 359/124 |
| 2002/0135838 A1 | 9/2002 | Way | |
| 2003/0025961 A1 | 2/2003 | Way | |
| 2003/0169470 A1 | 9/2003 | Alagar et al. | |
| 2004/0208561 A1 * | 10/2004 | Kinoshita et al. | 398/59 |
| 2005/0018600 A1 | 1/2005 | Tornar | |
| 2005/0025490 A1 | 2/2005 | Aoki et al. | |
| 2005/0078965 A1 | 4/2005 | Kim et al. | |
| 2005/0158047 A1 | 7/2005 | Way et al. | |
| 2005/0185969 A1 | 8/2005 | Moeller et al. | |
| 2005/0201762 A1 | 9/2005 | Moeller et al. | |
| 2005/0286908 A1 | 12/2005 | Way | |
| 2006/0051092 A1 | 3/2006 | Way | |
| 2006/0140643 A1 | 6/2006 | Way et al. | |
| 2006/0269295 A1 | 11/2006 | Way | |
| 2006/0275035 A1 | 12/2006 | Way | |
| 2007/0086332 A1 | 4/2007 | Way et al. | |

FOREIGN PATENT DOCUMENTS

| | | |
|---|---|---|
| WO | WO96/32787 | 10/1996 |
| WO | WO01/67647 | 9/2001 |
| WO | WO01/67648 | 9/2001 |
| WO | WO02/23772 | 3/2002 |
| WO | WO02/058301 | 7/2002 |
| WO | WO2004/002024 | 12/2003 |
| WO | WO 2004/064259 | 7/2004 |
| WO | WO2006/002080 | 1/2006 |
| WO | WO2006/119375 | 11/2006 |
| WO | WO2007/044939 | 4/2007 |

OTHER PUBLICATIONS

Adamczyk, et al. "All-Optical Output-Port Contention Resolution Using Subcarrier-Multiplexing", Optical Fiber Communications Conference 2000, Mar. 7-10, 2000, pp. 332-334.

Bannister, et al. "How Many Wavelengths Do We Really Need?, A Study of the Performance Limits of Packet Over Wavelengths", SPIE Optical Network Magazine, Apr. 2000, pp. 1-12.

Blumenthal, et al. "All-Optical Label Swapping with Wavelength Conversion for WDM-IP Networks with Subcarrier Multiplexed Addressing", IEEE Photonics Technology Letters, vol. 11, No. 11, Nov. 1999, pp. 1497-1499.

Byrav, et al. "Wavelength Conversion in WDM Networking", IEEE Journal on Selected Areas in Communication, vol. 16, Sep. 1998, pp. 1061.

Chao, et al. "A Photonic Front-End Processor in a WDM ATM Multicast Switch", Journal of Lightwave Technology, vol. 18, No. 3, Mar. 2000, pp. 273-285.

Derr, et al. "An Optical Infrastructure for Future Telecommunications Networks", IEEE Communications Magazine, vol. 33, No. 11, Nov. 1995 pp. 84-88.

Frankel, et al. "Optical Single-Sideband Suppressed-Carrier Modulator for Wide-Band Signal Processing", Journal of Lightwave Technology, vol. 16, No. 5, May 1998, pp. 859-863.

Ghani, "Lambda-Labeling: A Framework for IP-Over-WDM Using MPLS", Optical Networks Magazine, vol. 1, No. 2, Apr. 2000, pp. 45-58.

Hill, et al. "Multigigabit Subcarrier Multiplexed Coherent Lightwave System", Journal of Lightwave Technology, vol. 10, No. 11, Nov. 1992, pp. 1656-1664.

ITU-T Recommendation G.692, "Optical Interfaces for Multichannel Systems with Optical Amplifiers", Oct. 1998, pp. 14-23.

Izutsu, et al., "Integrated Optical SSB Modulation/Frequency Shifter", IEEE Journal of Quantum Electronics, vol. QE-17, No. 11, Nov. 1981, pp. 2225-2227.

Khrais, et al. "Effects of Cascaded Misaligned Optical (de)Multiplexers on Multiwavelength Optical Network Performance", OFC, Paper ThD-4, Feb. 1996.

Kitayama, "Highly Spetrum Efficient OFDM/PDM Wireless Networks by Using Optical SSB Modulation", Journal of Lightwave Technology, vol. 16, No. 6, Jun. 1998, pp. 969-976.

Lee, et al. "A Wavelength-Convertible Optical Network", Journal of Lightwave Technology, vol. 11, May/Jun. 1993, p. 962.

Masetti, et al. "High Speed, High Capacity ATM Optical Switches for Future Telecommunication Transport Networks", IEEE Journal on Selected Areas in Communications, vol. 14, No. 5, Jun. 1996, pp. 979-998.

Ohn, et al. "Dispersion Variable Fibre Bragg Grating Using a Piezoelectric Stack", Electronic Letters, vol. 32, No. 21, Oct. 10, 1996, pp. 2000-2001.

Okamoto, et al. "Optical Path Cross-Connect Systems for Photonic Networks", Global Telecommunications Conference, Nov. 1993, vol. 1, pp. 474-480.

Ramos, et al. "Comparison of Optical Single-Sideband Modulation and Chirped Fiber Gratings as Dispersion Mitigating Techniques in Optical Millimeter-Wave Multichannel Systems", IEEE Photonics Technology Letters, vol. 11, No. 11, Nov. 1999, pp. 1479-1481.

Shankar, "Duobinary Modulation for Optical Systems", Dec. 5, 2002, retrieved from the internet: http://www.inphi-corp.com/products/whitepapers/DuobinaryModulationForOpticalSystems.pdf On Oct. 14, 2005, 10 pages.

Sieben, et al. "Optical Single Sideband Transmission at 10 Gb/s Using Only Electrical Dispersion Compensation", Journal of Lightwave Technology, vol. 17, No. 10, Oct. 1999, pp. 1742-1748.

Smith, et al. "Broad-Band Millimeter-Wave (38 GHz) Fiber-Wireless Transmission System Using Electrical and Optical SSB Modulation to Overcome Dispersion Effects", IEEE Photonics Technology Letters, vol. 10, No. 1, Jan. 1998 pp. 141-143.

Spring, et al. "Photonic Header Replacement for Packet Switching", Electronic Letters, vol. 29, No. 17, Aug. 19, 1993, pp. 1523-1525.

Sun, et al. "Tunable Compensation of Dispersion-Induced RF Power Degradation in Multiple-Channel SCM Transmission by Nonlinearly-Chirped FBG's", CLEO '99, 1999, pp. 316-317.

Walkin, "Multilevel Signaling for Increasing the Reach of 10 Gb/s Lightwave Systems", Journal of Lightwave Technology, vol. 17, No. 11, Nov. 1999 pp. 2235-2248.

Way, "Broadband Hybrid Fiber Coax Access System Technologies", New York Acacemic Press, 1998, pp. 253-300.

Wu, et al. "CSO Distortions Due to the Combined Effects of Self- and External-Phase Modulations in Long-Distance 1550-nm AM-CATV Systems", IEEE Photonics Technology Letters, vol. 11, No. 6, Jun. 1999, pp. 718-720.

Yonenaga, et al. "Dispersion-Tolerant Optical Transmission System Using Duobinary Transmitter and Binary Receiver", Journal of Lightwave Technology, vol. 15, No. 8, Aug. 1997, pp. 1530-1537.

Yonenaga, et al. "Optical Duobinary Transmission System With No Receiver Sensitivity Degradation", Electronic Letters, vol. 21, No. 4, Feb. 4, 1995, pp. 201-203.

Bosco, G. et al., "Modulation formats suitable for ultrahigh spectral efficient WDM systems," IEEE J. Selected Topics in Quantum Electron. 10(22): 321-328 (Mar./Apr. 2004).

Bosco, G. et al., "On the use of NRZ, RZ, and CSRZ modulation at 40 Gb/s with narrow DWDM channel spacing," Journal of Lightwave Technology, p. 1694-1704, Sep. 2002.

Daikoku, M. et al., "Performance comparison of modulation formats for 40Gb/s DWDM transmission systems," paper OFN2, Optical Fiber Communications (OFC) Conference, 2005, 3 pages.

Gerstel, O. and R. Ramaswami, "Optical layer survivability: a service perspective," IEEE Communications Magazine, pp. 104-113, Mar. 2000.

Gnauck, A.H. and P.J. Winzer, "Optical phase shifted keyed transmission," Journal of Lightwave Technology 23(1): 115-130 (Jan. 2005).

Goldstein et al., "Performance implications of component crosstalk in transparent lightwave netowrks," IEEE Photonics Technolog Letters 6(5): 657-660, (May 1994).

Heismann, "Polarization Mode Dispersion: Fundamentals and Impact on Optical Communication System", European Conference of Optical Communications (ECOC '98), Sep. 20-24, 1998, Madrid, Spain, vol. 2, pp. 51-79 (1998).

Hui, R., "Multitributary OFDM optical transmitter using carrier-suppressed optical single-sideband modulation," Optical Fiber Communications Conference, 2003. OFC 2003, Mar. 23-28, 2003 pp. 92-93.

Hui et al., "10 Gb/s SCM system using optical single side-band modulation," Optical Fiber Communication Conference and Exhibit, 2001. OFC 2001, vol. 1, Issue , 2001 pp. MM4-1-MM4-4.

Jiang et al., "Multi-Lane PMD Reliability and Partial Fault Protection (PFP)," IEEE 802.3ba, Jan. 2008, 25 pages, http://www.ieee802.org/3/ba/public/jan08/jiang_01_0108.pdf [accessed on Apr. 8, 2008].

Johansson, B.S. et al., "Flexible bus: a self-restoring optical ADM ring architecture," Electronic Letters, vol. 32, No. 25, pp. 2338-2339, Dec. 1996.

Joo, Y. et al., "1-fiber WDM self-healing ring with bidirectional optical add/drop muliplexers," IEEE Photon. Technol. Lett. 16(2):: 683-685 (Feb. 2004).

Kaminow, I. and T. Li, (Eds.), *Optical Fiber Telecommunications IVB: Systems and Impairments*, San Diego: Academic Press, Chapter 16, pp. 868-876 (2002).

Kinoshita et al., "Metro WDM network with photonic Domains," Optical Fiber Communication Conference OFC 2004, vol. 1, Feb. 23-27, 2004, 3 pages.

Lyubomirsky, I. and C. Chien, "Tailoring the duobinary pulse shape for optimum performance," J. Lightwve Technology 23(11): 3732-3736 (Nov. 2005).

Ono, T. et al., "Characteristics of optical duobinary signals in terabit/s capacity, high spectral efficiency WDM systems," J. Lightwave Technology 16(5): 788-797, May 1998.

Sano et al., "30×100 gb/s all-optical OFDM transmission over 1300 km SMF with 10 ROADM nodes", Technical Digest of ECOC 2007, Paper PDS1.7 (2007), 2 pages.

Sargis, P.D. et al., "10-G-b/s subcarrier muliplexed transmission over 490 km of ordinary single-mode fiber without dispersion compensation," IEEE Photon. Technol. Lett. 9(12):: 1658-1660, (Dec. 1997).

Shi et al., "High-speed electrooptic modulator characterization using optical spectrum analysis," J. Lightway Technol. 21(10): 2358-2367, (Oct. 2003).

Shtaif, M. and A.H. Gnauck, "The relation between optical duobinary modulation and spectral efficiency in WDM systems," IEEE Photon. Technol. Lett. 11(6): 712-714 (Jun. 1999).

Smith et al., "Overcoming Chromatic-Dispersion Effects in Fiber-Wireless Systems Incorporating External Modulators," IEEE Transactions on Microwave Theory and Techniques 45(8): 1410-1415 (Aug. 1997).

van den Borne, D. et al., "Coherent equalization versus direct detection for 111-Gb/s Ethernet transport," IEEE LEOS Summer Tropical Meetings, pp. 11-12, Jul. 23-25, 2007.

van Deventer et al., "Power penalties due to Brillouin and Rayleigh scattering in a bi-directional coherent transmission system," IEEE Photon. Lett. 6(2): 291-294 (Feb. 1994).

Way, W.I.., "Spectrally efficient parallel PHY for 100 GbE MAN and WAN," IEEE Applications and Practice (distributed with IEEE Communications Magazine). pp. 20-23, (Dec. 2007).

Weng, C. and W.I. Way, "A Single-Fiber Optical Unidirectional Path-Switched-Ring Network Using Double-Sideband-Suppressed Carrier Modulation Technique," Photonics Technology Letters, IEEE 18(21): 2236-2238 (Nov. 1, 2006).

Winzer, P. and G. Raybon, "100G Ethernet- a review of serial transport options," IEEE LEOS Summer Tropical Meetings, Jul. 23-25, 2007, pp. 7-8.

Wree, C. et al., "Coherent receivers for phase-shift keyed transmission," OFC/NFOEC, paper OMP6, 2007, 3 pages.

Xie, C. et al., "Improvement of optical NRZ- and RZ-duobinary transmission systems with narrow bandwidth optial filters," IEEE Photon. Tech. Lett. 16(9): 2162-2164 (Sep. 2004).

* cited by examiner

FULLY PROTECTED BROADCAST AND SELECT ALL OPTICAL NETWORK

CROSS-REFERENCE TO RELATED APPLICATIONS

This application is a continuation-in-part of U.S. Ser. No. 09/990,196 filed Nov. 21, 2001, now U.S. Pat. No. 6,895,184 and of Ser. No. 09/575,811 filed May 22, 2000, now U.S. Pat. No. 6,525,857 all of which applications are fully incorporated herein by reference. In addition, this application claims the benefit of U.S. Provisional Application No. 60/346,786, filed Jan. 7, 2002.

BACKGROUND OF THE INVENTION

1. Field of the Invention

The present invention relates generally to all optical networks, and more particularly to an all optical network that uses broadcast and select ring architecture with various configurations to protect ring fibers, WDM equipment and client equipment.

2. Description of the Related Art

Broadcast-and-select technique has been used in linear, star, and ring optical networks. In a broadcast-and-select optical network, multiple wavelengths in a fiber are simultaneously broadcast to multiple destinations via one or more optical couplers. At each destination, there is either a tunable filter or a fixed filter/demultiplexer to perform the "select" function.

However, optical ring networks usually require protection on one or all of the following facilities: (i) optical fibers on the ring; (ii) WDM equipment; and (iii) client equipment, including but not limited to SONET/SDH, Gigabit Ethernet, Fiber Channel and the like. There is no method to achieve any of these protections in a broadcast and select optical network.

There is a need for a fully-protected broadcast and select architecture in an all optical fiber ring network. There is a further need for a passive fiber ring network that does not have active elements. When there are in-line optical amplifiers on a ring network, there is a further need for an all optical fiber ring network that has minimal fiber ring lasing or coherent cross-talk on the ring. There is still a further need for an all optical fiber ring network that eliminates in-line amplifier gain saturation on the ring by equalizing all wavelength powers at the input of each in-line amplifier.

SUMMARY

Accordingly, an object of the present invention is to provide a broadcast and select architecture in an all optical fiber ring network.

Another object of the present invention is to provide a broadcast and select optical ring network with fiber protection, and/or WDM equipment, protection, and/or client equipment protection.

Another object of the present invention is to provide a passive fiber ring network that does not have active elements.

Yet another object of the present invention is to provide an all optical fiber ring network, which uses inline optical amplifiers, that has minimal fiber ring lasing or coherent cross-talk on the ring.

A further object of the present invention is to provide an all optical fiber ring network that eliminates in-line amplifier gain saturation on the ring, by equalizing the power levels of all wavelengths on the ring at the input of each in-line amplifier.

These and other objects of the present invention are achieved in an all optical network for optical signal traffic that provides at least a first ring with at least a first clockwise fiber, a second counter-clockwise fiber and a plurality of network nodes. Each node has at least a WDM transponder that with a line-side transmitter and a client-side receiver in a first direction, and a line-side receiver and a client-side transmitter in an opposing second direction. The line-side receiver includes a fixed or a tunable optical wavelength filter. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber.

In another embodiment of the present invention, an all optical network for optical signal traffic provides at least a first ring with at least a first clockwise fiber, a second counter-clockwise fiber and a plurality of network nodes. Each node has at least a WDM transponder that with a line-side transmitter and a client-side receiver in a first direction, and a line-side receiver and a client-side transmitter in an opposing second direction. The line-side receiver includes a fixed or a tunable optical wavelength filter. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. A first coupler pair includes first and second couplers in each network node. The first coupler has first and second output ports and a first input port coupled to a line-side transmitter. The first output port is coupled to the clockwise fiber and the second output port is coupled to the counter-clockwise fiber. The first coupler enables the line-side transmitter to launch signals to both the clockwise and counter-clockwise fibers. The second coupler has first and second input ports and a first output port coupled to a line-side receiver. The first input port is coupled to the clockwise fiber and the second input port coupled to the counter-clockwise fiber. The second coupler enables the line-side receiver to receive signals from both the clockwise and counter-clockwise fibers.

In another embodiment of the present invention, an all optical network for optical signal traffic has a first ring with at least a clockwise and a counter-clockwise fiber and a plurality of network nodes. Each node has at least a WDM transponder that includes a line-side transmitter and a client-side receiver in a first direction, and a line-side receiver and a client-side transmitter in an opposing second direction. The line-side receiver includes a fixed or a tunable optical wavelength filter. At least a first add and a first drop broadband couplers are positioned on the first ring. Each coupler has first and second ports for through traffic and a third port for adding or dropping local traffic. The first add and first drop broadband couplers are configured to minimize a pass-through loss in each fiber. A first switch pair includes first and second switches. The first switch has first and second output ports and a first input port coupled to the line-side transmitter. The first output port is coupled to the clockwise fiber and the second output port is coupled to the counter-clockwise fiber. The first switch enables the line-side transmitter to launch signals to either the clockwise or counter-clockwise fibers. The second switch has first and second input ports and a first output port coupled to the line-side receiver. The first input port is coupled to the clockwise fiber and the second input port is coupled to the counter-clockwise fiber. The second switch enables the line-side receiver to receive signals from either the clockwise or counter-clockwise fiber.

In another embodiment of the present invention, an all optical network for optical signal traffic has a first ring with at least a clockwise and a counter-clockwise fibers and a plurality of network nodes. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. First and second coupler pairs are provided and each include first and second couplers. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are coupled to a receiver and a transmitter of the working client side equipment respectively. A protection WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively.

In another embodiment of the present invention, an all optical network for optical signal traffic has a first ring with at least a clockwise and a counter-clockwise fibers and a plurality of network nodes. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are coupled to a receiver and a transmitter of the working client side equipment respectively. A protection WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. First and second coupler pairs are provided and each include first and second couplers. The first coupler pair is coupled to the working WDM transponder and the second coupler pair is coupled to the protection WDM transponder. The first coupler has first and second output ports and a first input port coupled to the WDM transponder line-side transmitter. The first output port is coupled to the clockwise fiber and the second output port is coupled to the counter-clockwise fiber. The first coupler enables the WDM transponder line-side transmitter to launch signals to both the clockwise and counter-clockwise fibers. The second coupler has first and second input ports and a first output port coupled to the WDM transponder line-side receiver. The first input port is coupled to the clockwise fiber and the second input port is coupled to the counter-clockwise fiber. The second coupler enables the WDM transponder line-side receiver to receive signals from both the clockwise and counter-clockwise fibers.

In another embodiment of the present invention, an all optical network for optical signal traffic includes a first ring with at least a first clockwise and a second counter-clockwise fibers and a plurality of network nodes. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are connected back to back to a receiver and a transmitter of working client equipment respectively. A protection WDM transponder is coupled to the first ring. The protection WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. First and second coupler pairs are provided, each with first and second couplers. A 1×2 coupler is configured to launch client optical signals to the WDM working transponder and the WDM protection transponder. A 1×2 coupler is configured to permit client equipment to receive signals from either the working WDM transponder or the protection WDM transponder. A client-side transmitter on the WDM equipment is turned off to reduce coherent cross talk and interference.

In another embodiment of the present invention, an all optical network for optical signal traffic includes a first ring with at least a first clockwise and a second counter-clockwise fibers and a plurality of network nodes. At least a first add and a first drop broadband couplers are positioned on each fiber. Each coupler has first and second ports for through traffic and a third port for adding or dropping local traffic. The first add and first drop broadband couplers are configured to minimize a pass-through loss in each fiber. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are connected back to back to a receiver and a transmitter of working client equipment respectively. A protection WDM transponder is coupled to the first ring. The protection WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. First and second coupler pairs are provided, each with first and second couplers. The first coupler pair is coupled to the working WDM transponder and the second coupler pair is coupled to the protection WDM transponder. The first coupler has first and second output ports and a first input port coupled to the WDM transponder line-side transmitter. The first output port is coupled to the clockwise fiber and the second output port is coupled to the counter-clockwise fiber. The first coupler enables the WDM transponder line-side transmitter to launch signals to both the clockwise and counter-clockwise fibers. The second coupler has first and second input ports and a first output port coupled to the WDM transponder line-side receiver. The first input port is coupled to the clockwise fiber and the second input port is coupled to the counter-clockwise fiber. The second coupler enables the WDM transponder line-side receiver to receive signals from both the clockwise and counter-clockwise fibers. A 1×2 coupler is configured to launch client optical signals to the WDM working transponder and the WDM protection transponder. A 1×2 coupler is configured to permit client equipment to receive signals from either the working WDM transponder or the protection WDM transponder. A client-side transmitter on the WDM equipment is turned off to reduce coherent crosstalk and interference.

In another embodiment of the present invention, an all optical network for optical signal traffic has a first ring with at least a first clockwise and a second counter-clockwise fibers and a plurality of network nodes. At least a first add and a first drop broadband couplers are coupled to each fiber. Each coupler has first and second ports for through traffic and a third port for adding traffic to or from each ring fiber. The first add and first drop broadband couplers are positioned on the first ring and configured to minimize a pass-through loss in the first ring. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are connected back to back to a receiver and a transmitter of working client equipment respectively. A protection WDM transponder is coupled to the first ring. The protection WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. First and second switch pairs are provided, each with first and second switches.

In another embodiment of the present invention, an all optical network for optical signal traffic has a first ring with at least a first clockwise and a second counter-clockwise fibers and a plurality of network nodes. At least a first add and a first drop broadband couplers are coupled to each fiber. Each coupler has first and second ports for through traffic and a third port for adding traffic to or from each ring fiber. The first add and first drop broadband couplers are positioned on each fiber, and configured to minimize a pass-through loss in each fiber. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are connected back to back to a receiver and a transmitter of working client equipment respectively. A protection WDM transponder is coupled to the first ring. The protection WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. First and second switch pairs are provided, each with first and second switches. The first switch pair is coupled to the working WDM transponder and the second switch pair is coupled to the protection WDM transponder. The first switch has first and second output ports and a first input port coupled to the WDM transponder line-side transmitter. The first output port is coupled to the clockwise fiber and the second output port is coupled to the counter-clockwise fiber. The first switch enables the WDM transponder line-side transmitter to launch signals to either the clockwise or counter-clockwise fibers. The second switch has first and second input ports and a first output port coupled to the WDM transponder line-side receiver. The first input port is coupled to the clockwise fiber and the second input port is coupled to the counter-clockwise fiber. The second switch enables the WDM transponder line-side receiver to receive signals from either the clockwise or counter-clockwise fibers.

In another embodiment of the present invention, an all optical network for optical signal traffic has a first ring with at least a first clockwise and a second counter-clockwise fibers and a plurality of network nodes. At least a first add and a first drop broadband couplers are coupled to each fiber. Each coupler has first and second ports for through traffic and a third port for adding traffic to or from each ring fiber. The first add and first drop broadband couplers are positioned on each fiber and configured to minimize a pass-through loss in each fiber. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are connected back to back to a receiver and a transmitter of working client equipment respectively. A protection WDM transponder is coupled to the first ring. The protection WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. First and second switch pairs are provided, each including first and second switches. A 1×2 coupler is configured to launch client optical signals to the WDM working transponder and the WDM protection transponder. A 1×2 coupler is configured to permit client equipment to receive signals from either the working WDM transponder or the protection WDM transponder. A client-side transmitter on the WDM equipment is turned off to reduce coherent crosstalk and interference.

In another embodiment of the present invention, an all optical network for optical signal traffic has a first ring with at least a first clockwise and a second counter-clockwise fibers and a plurality of network nodes. At least a first add and a first drop broadband couplers are coupled to each fiber. Each coupler has first and second ports for through traffic and a third port for adding traffic to or from each fiber. The first add and first drop broadband couplers are positioned on each fiber and configured to minimize a pass-through loss in each fiber. A working WDM transponder is coupled to the first ring. The working WDM transponder includes a line-side transmitter and a client-side receiver in a first direction, and a line-side receiver and a client-side transmitter in an opposing second direction. The client side transmitter and the client side receiver of the working WDM transponder are connected back to back to a receiver and a transmitter of working client equipment respectively. A protection WDM transponder is coupled to the first ring. The protection WDM transponder includes a line-side transmitter and a client-side receiver in a first direction, and a line-side receiver and a client-side transmitter in an opposing second direction. The client side transmitter and the client side receiver of the protection WDM transponder are coupled to a receiver and a transmitter of the protection client side equipment respectively. First and second switch pairs are provided, each including first and second switches. The first switch pair is coupled to the working WDM transponder and the second switch pair is coupled to the protection WDM transponder. The first switch has first and second output ports and a first input port coupled to the WDM transponder line-side transmitter. The first output port is coupled to the clockwise fiber and the second output port being is coupled to the counter-clockwise fiber. The first switch enables the WDM transponder line-side transmitter to launch signals to either the clockwise or counter-clockwise fibers. The second switch has first and second input ports and a first output port coupled to the WDM transponder line-side receiver. The first input port is coupled to the clockwise fiber and the second input port is coupled to the counter-clockwise fiber. The second switch enables the WDM transponder line-side receiver to receive signals from either the clockwise or counter-clockwise fibers. A 1×2 coupler is configured to launch client optical signals to the WDM working transponder and the WDM protection transponder. A 1×2 coupler is configured to permit client equipment to receive signals from either the working WDM transponder or the protection WDM transponder. A client-side transmitter on the WDM equipment is turned off to reduce coherent crosstalk and interference.

BRIEF DESCRIPTION OF THE DRAWINGS

FIG. 7(a) illustrates another embodiment of a broadcast and select metro-optical network architecture with a Hub that contains WDM Muxes, demuxes, transceivers or OEO regenerators and the like.

DETAILED DESCRIPTION OF THE PREFERRED EMBODIMENTS

Figure 1A:
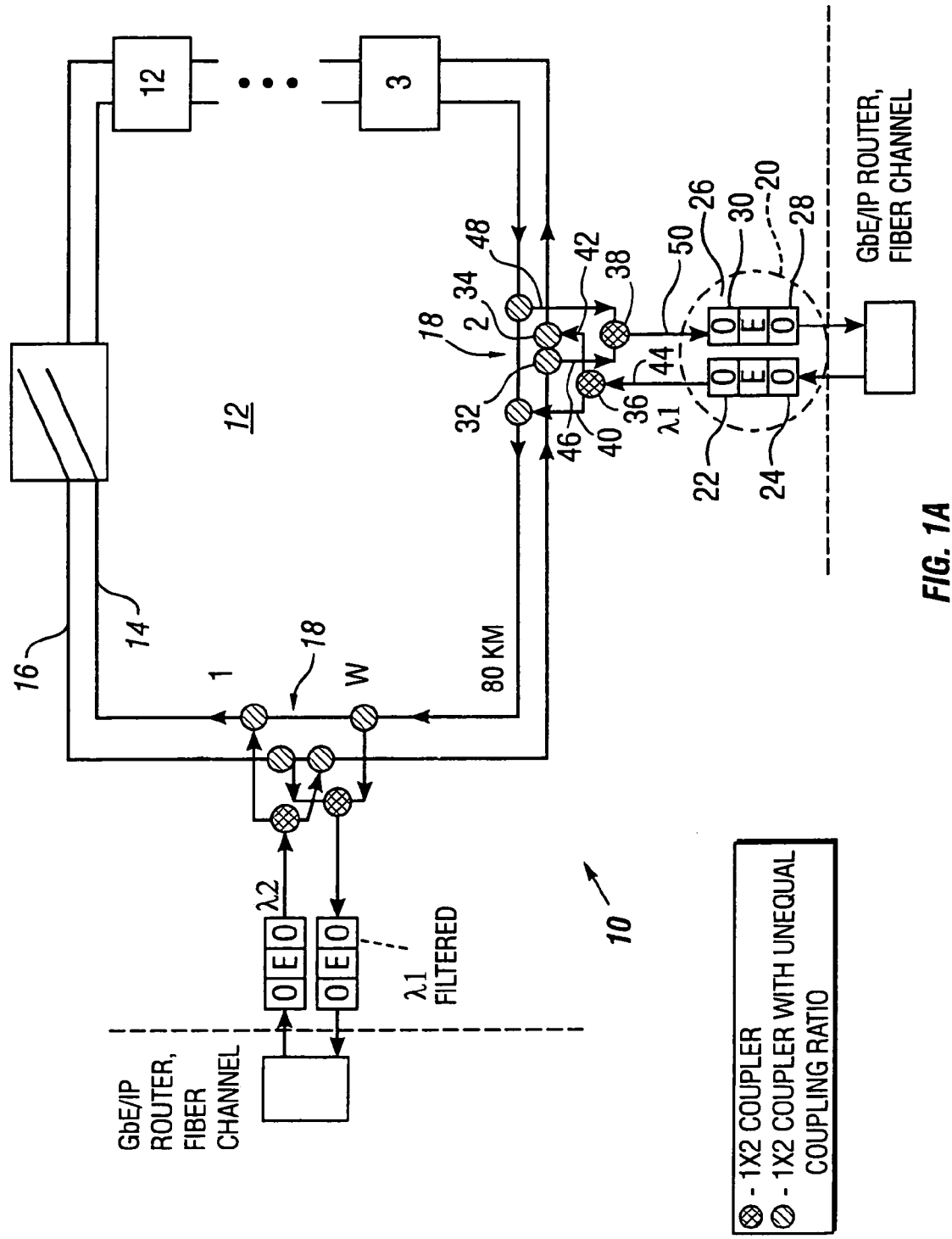
FIG. 1(a) illustrates one embodiment of an all optical network of the present invention that uses couplers in each node to protect fibers in a ring.

Referring now to FIG. 1(a), an all optical network 10 for optical signal traffic provides at least a first ring 12 with at least a first clockwise fiber 14, a second counter-clockwise fiber 16 and a plurality of network nodes 18. Each node 18 has at least a WDM transponder 20 with a line-side transmitter 22 and a client-side receiver 24 in a first direction, and a line-side receiver 26 and a client-side transmitter 28 in an opposing second direction. Line-side receiver 26 can include a fixed or a tunable optical wavelength filter 30. At least first add and a first drop broadband couplers 32 and 34 are positioned on each fiber 14 or 16. Each coupler 32 and 34 has three ports for through traffic and for adding or dropping local traffic. First add and first drop broadband couplers 32 and 34 minimize a pass-through loss in fibers 12 or 14, and to ensure that he power levels of locally added wavelengths can be equalized to those of through-wavelengths.

A first coupler pair includes first and second couplers 36 and 38 in each network node 18. First coupler 36 has first and second output ports 40 and 42 respectively, and a first input port 44 coupled to a line-side transmitter 22. First output port 40 is coupled to clockwise fiber 14 and second output port 42 is coupled to counter-clockwise fiber 16. First coupler enables the line-side transmitter to launch signals to both clockwise and counter-clockwise fibers 14 and 16. Second coupler 38 has first and second input ports 46 and 48 and a first output port 50 coupled to a line-side receiver 26. First input port 48 is coupled to clockwise fiber 14 and second input port 46 is coupled to counter-clockwise fiber 16. Second coupler 38 enables the line-side receiver to receive signals from both clockwise and counter-clockwise fibers 14 and 16. Note that in each node, the transmitted wavelengths are always different from the selectively received wavelengths.

Figure 1B:
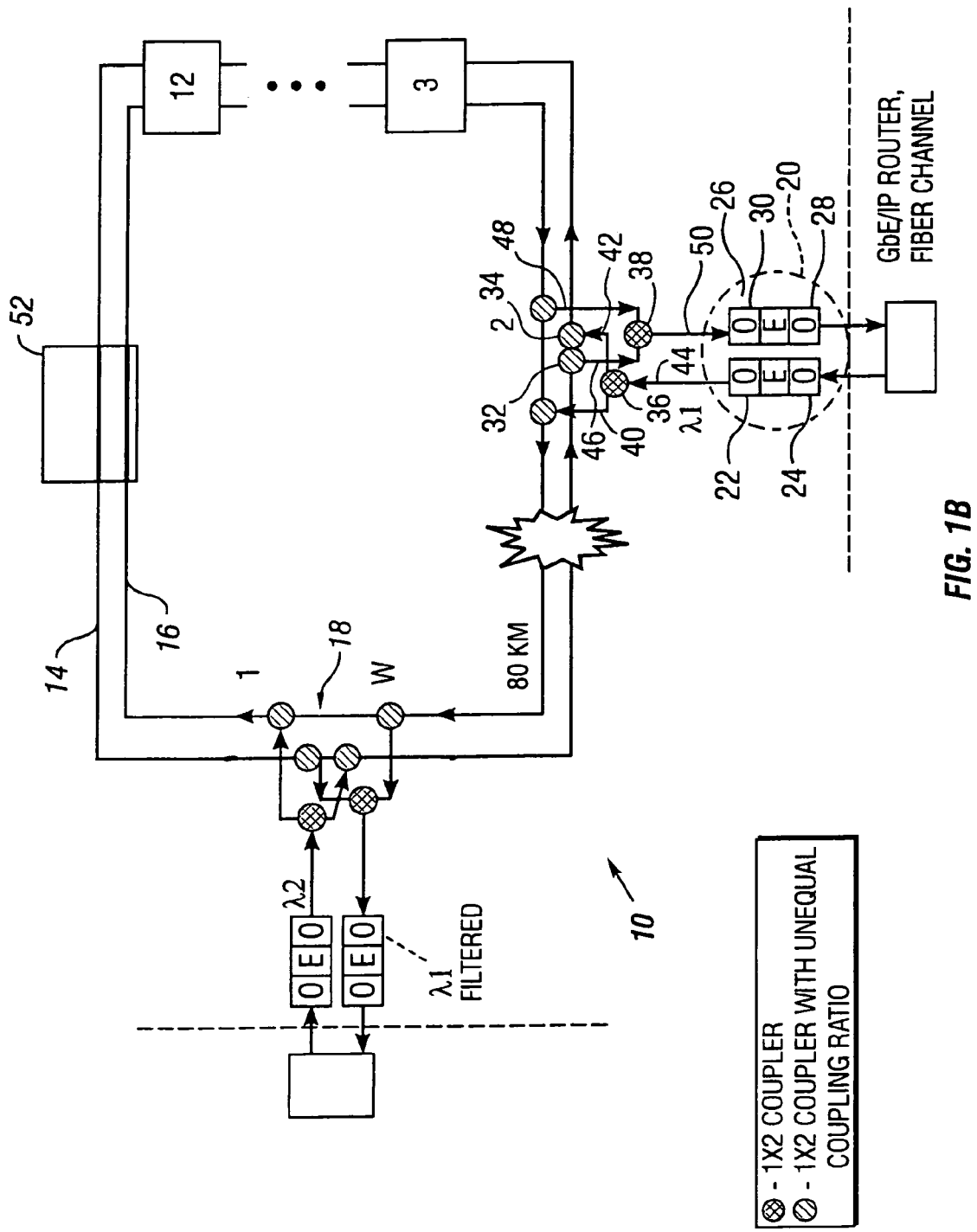
FIG. 1(b) illustrates recovery of the FIG. 1(a) all optical network after a fiber breaks.

FIG. 1(b) illustrates recovery of all optical network 10 after fiber 14 or 16 breaks. In hub 52, an optical switch coupled to fiber 14 and an optical switch coupled to fiber 16 are now closed. These optical switches can be 1×1 or 1×2 switches.

Figure 2A:
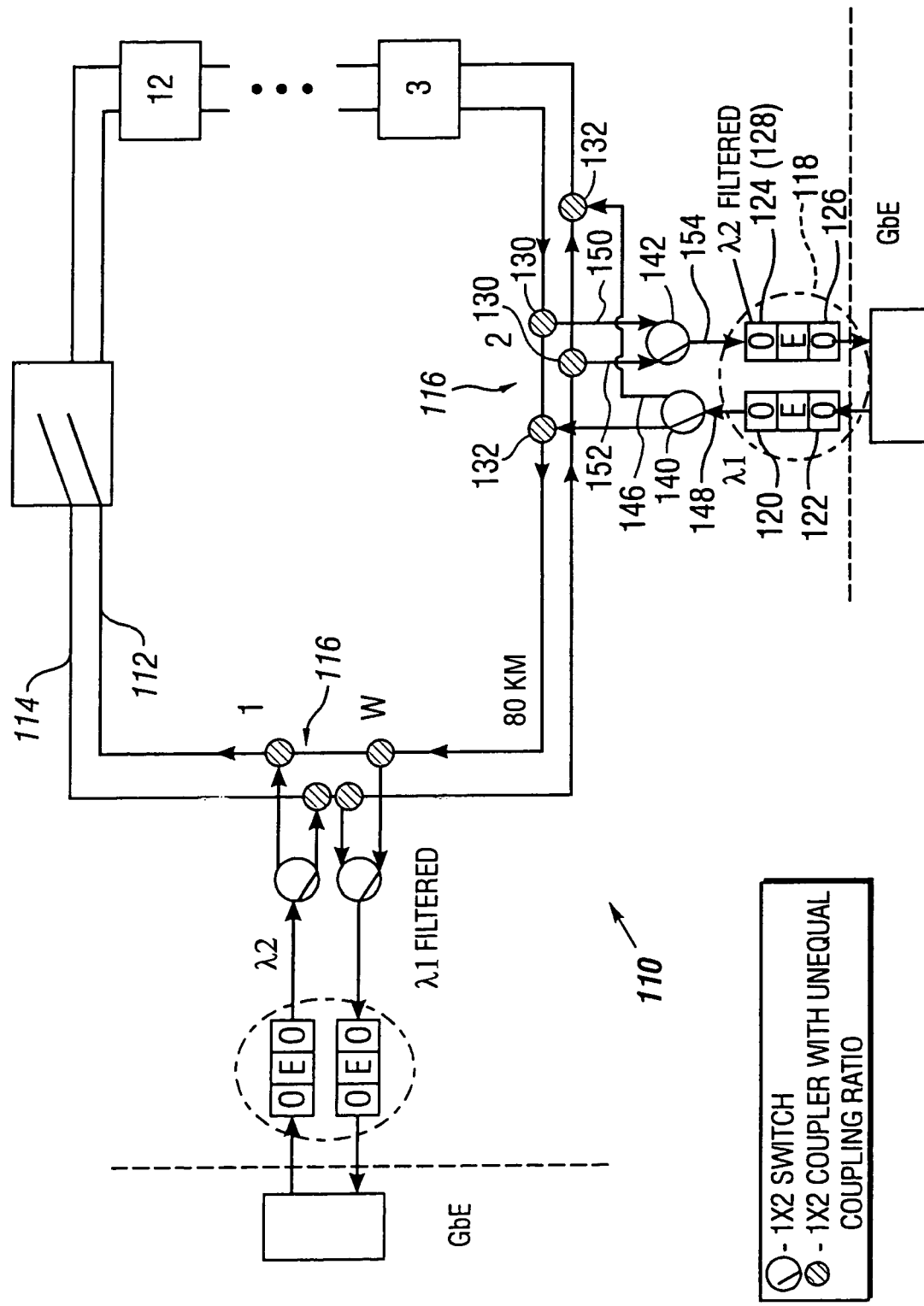
FIG. 2(a) illustrates one embodiment of an all optical network of the present invention that uses 1×2 switches in each node to protect fibers in a ring.

In another embodiment of the present invention illustrated in FIG. 2(a), an all optical network 100 for optical signal traffic has a first ring 110 with at least a clockwise 112 and a counter-clockwise fiber 114 and a plurality of network nodes 116. Each node 116 has at least a WDM transponder 118 that includes a line-side transmitter 120 and a client-side receiver 122 in a first direction, and a line-side receiver 124 and a client-side transmitter 126 in an opposing second direction.

Line-side receiver 124 includes a fixed or a tunable optical wavelength filter 128. At least a first add and a first drop broadband couplers 130 and 132 are positioned on each fiber 112 or 114. Each coupler has three ports for through traffic and for adding or dropping local traffic. First add and first drop broadband couplers 130 and 132 are configured to minimize a pass-through loss in first ring 110, and to ensure that he power levels of locally added wavelengths can be equalized to those of through-wavelengths.

A first switch pair includes first and second switches 140 and 142. First switch 140 has first and second output ports 144 and 146 and a first input port 148 coupled to line-side transmitter 120. First output port 144 is coupled to clockwise fiber 112 and second output port 146 is coupled to counter-clockwise fiber 114. First switch 140 enables line-side transmitter 120 to launch signals to either clockwise 112 or counter-clockwise fiber 114. Second switch 142 has first and second input ports 150 and 152 and a first output port coupled 154 to line-side receiver 124. First input port 150 is coupled to clockwise fiber 112 and second input port 152 is coupled to counter-clockwise fiber 114. Second switch 142 enables line-side receiver 124 to receive signals from either clockwise or counter-clockwise fibers 112 and 114. In a hub, an optical switch coupled to fiber 112 and an optical switch coupled to fiber 114 are now open. These optical switches can be 1×1 or 1×2 switches.

Figure 2B:
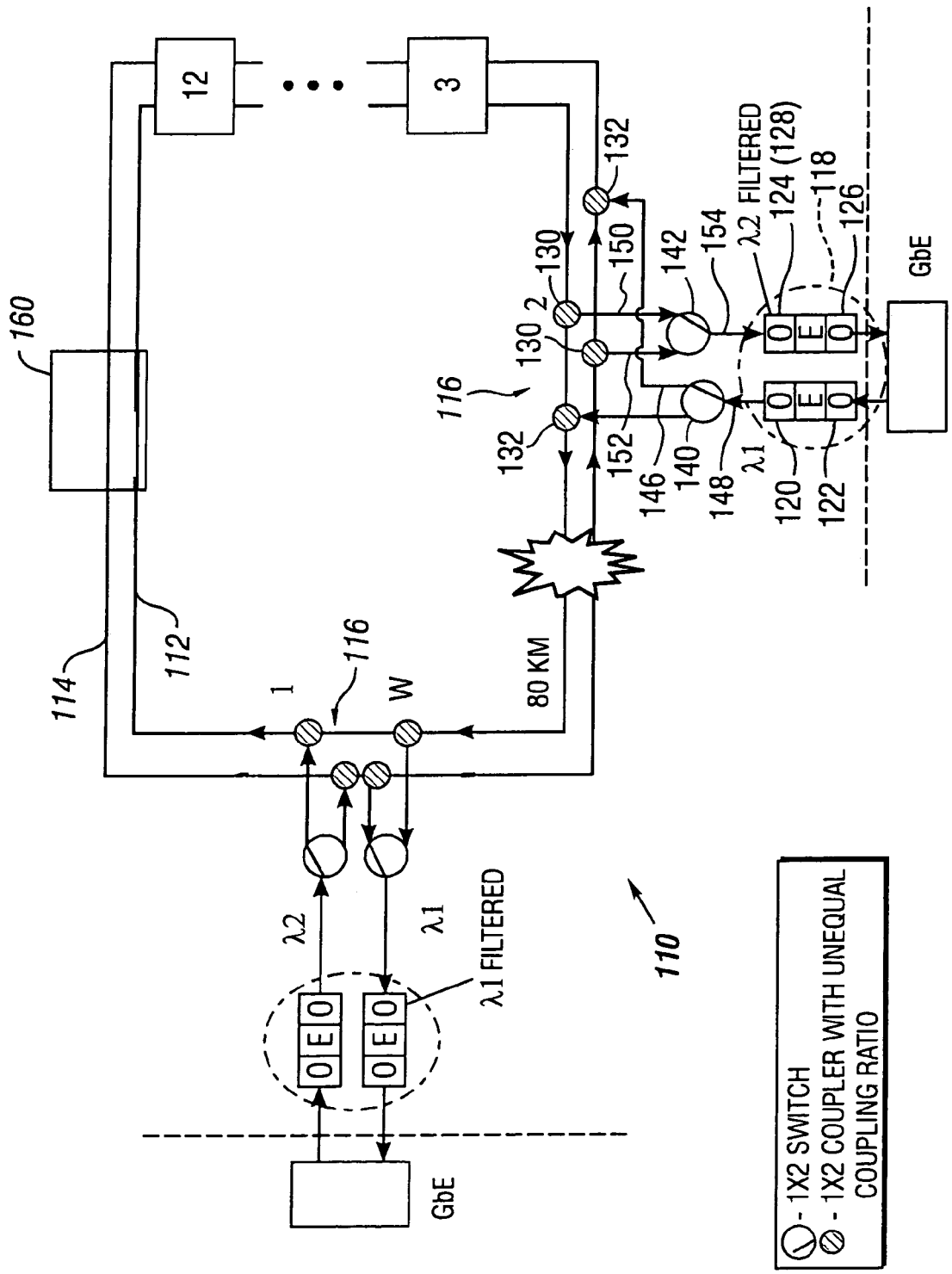
FIG. 2(b) illustrates recovery of the FIG. 2(a) all optical network after a fiber breaks.

FIG. 2(b) illustrates recovery of all optical network 100 after a break of fiber 112 or 114. In hub 160, an optical switch coupled to fiber 112 and an optical switch coupled to fiber 114 are now closed. Switches 140 and 142 are flipped to transmit and receive signals from a direction where there is no fiber break.

Figure 3A:
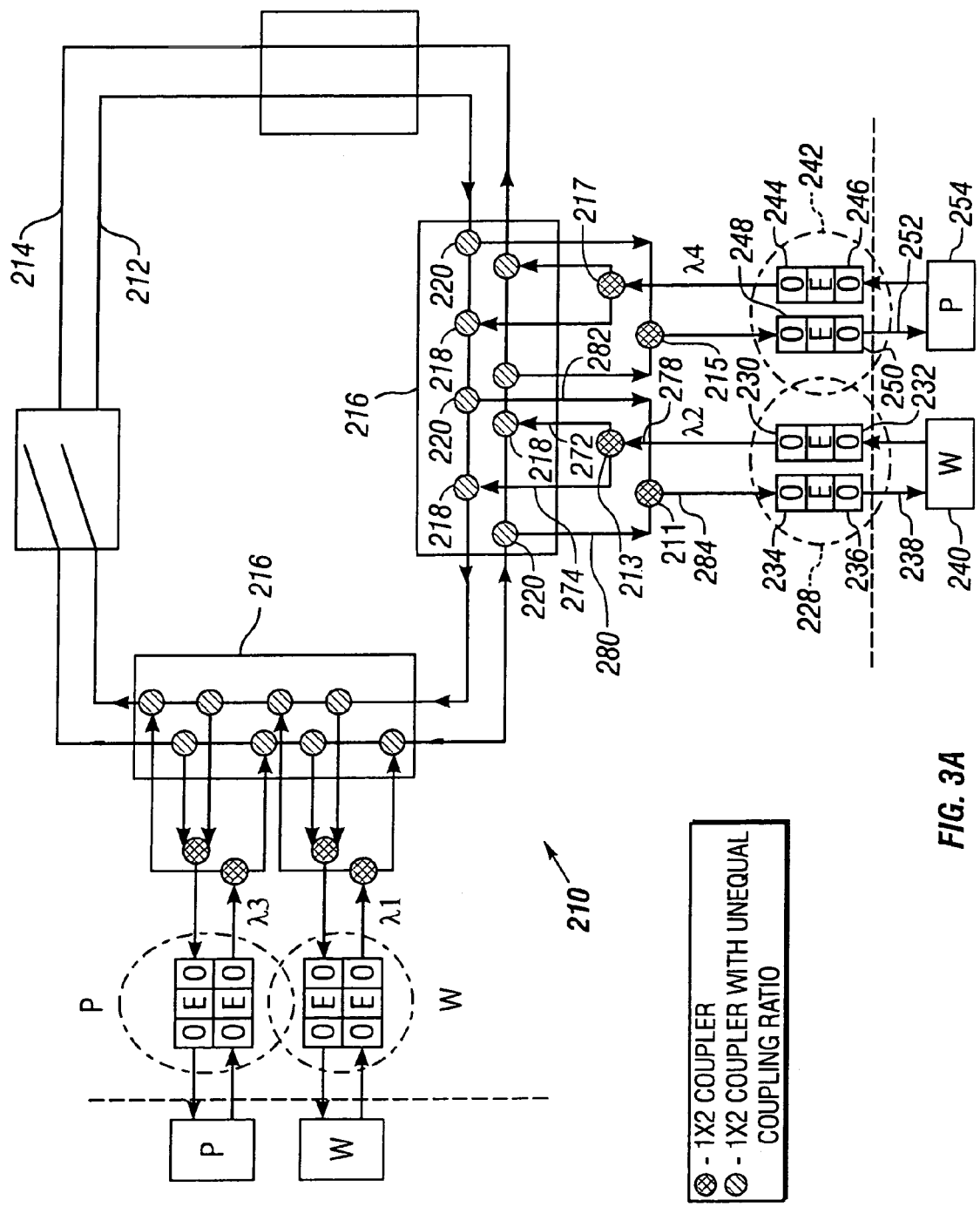
FIG. 3(a) illustrates one embodiment of an all optical network of the present invention that uses couplers in each node to protect client equipment, WDM equipment and fibers in a ring.

In another embodiment of the present invention illustrated in FIG. 3(a), an all optical network 200 for optical signal traffic has a first ring 210 with at least a clockwise and a counter-clockwise fibers 212 and 214 and a plurality of network nodes 216.

A working WDM transponder 228 is coupled to first ring 210. Working WDM transponder 228 includes a line-side transmitter 230 and a client-side receiver 232 in a first direction, and a line-side receiver 234 and a client-side transmitter 236 in an opposing second direction. Client side transmitter 236 and client side receiver 232 of working WDM transponder 228 are coupled to a receiver 238 and a transmitter 240 of the working client side equipment respectively.

A protection WDM transponder 242 is coupled to first ring 210. Protection WDM transponder 242 includes a line-side transmitter 244 and a client-side receiver 246 in a first direction, and a line-side receiver 248 and a client-side transmitter 250 in an opposing second direction. Client side transmitter 250 and the client side receiver 246 of protection WDM transponder 242 are coupled to a receiver 252 and a transmitter 254 of the protection client side equipment respectively.

At most two pairs of couplers are provided on each fiber 212 or 214. Each coupler pair includes a first add and a first drop broadband couplers 218 and 220 are positioned on each fiber. Each coupler 218 and 220 has three ports for through traffic and for adding or dropping local traffic. First add and first drop broadband couplers 218 and 220 are configured to minimize a pass-through loss in either 212 or 214, and to ensure that the power levels of locally added wavelengths can be equalized to those of through-wavelengths.

First coupler pair 211 and 213 is coupled to working WDM transponder 228 and second coupler pair 215 and 217 is coupled to protection WDM transponder 242. First coupler 213 of the first pair has first and second output ports 274 and 276 and a first input port 278 coupled to WDM transponder line-side transmitter 230. First output port 274 is coupled to clockwise fiber 212 and second output port 276 is coupled to counter-clockwise fiber 414.

First coupler 213 of the first pair enables WDM transponder line-side transmitter 230 to launch signals to both clockwise and counter-clockwise fibers 212 and 214. Second coupler 211 of the first pair has first and second input ports 280 and 282 and a first output port 284 coupled to WDM transponder line-side receiver 234. First input port 280 is coupled to counter-clockwise fiber 214 and second input port 282 is coupled to clockwise fiber 212. Second coupler 211 of the first pair enables WDM transponder line-side receiver 234 to receive signals from both clockwise and counter-clockwise fibers 212 and 214. Exactly the same arrangement is also installed for the protection WDM transponder, as shown in FIG. 3(a). Note that in each node, the transmitted wavelengths are always different from the selectively received wavelengths.

Figure 3B:
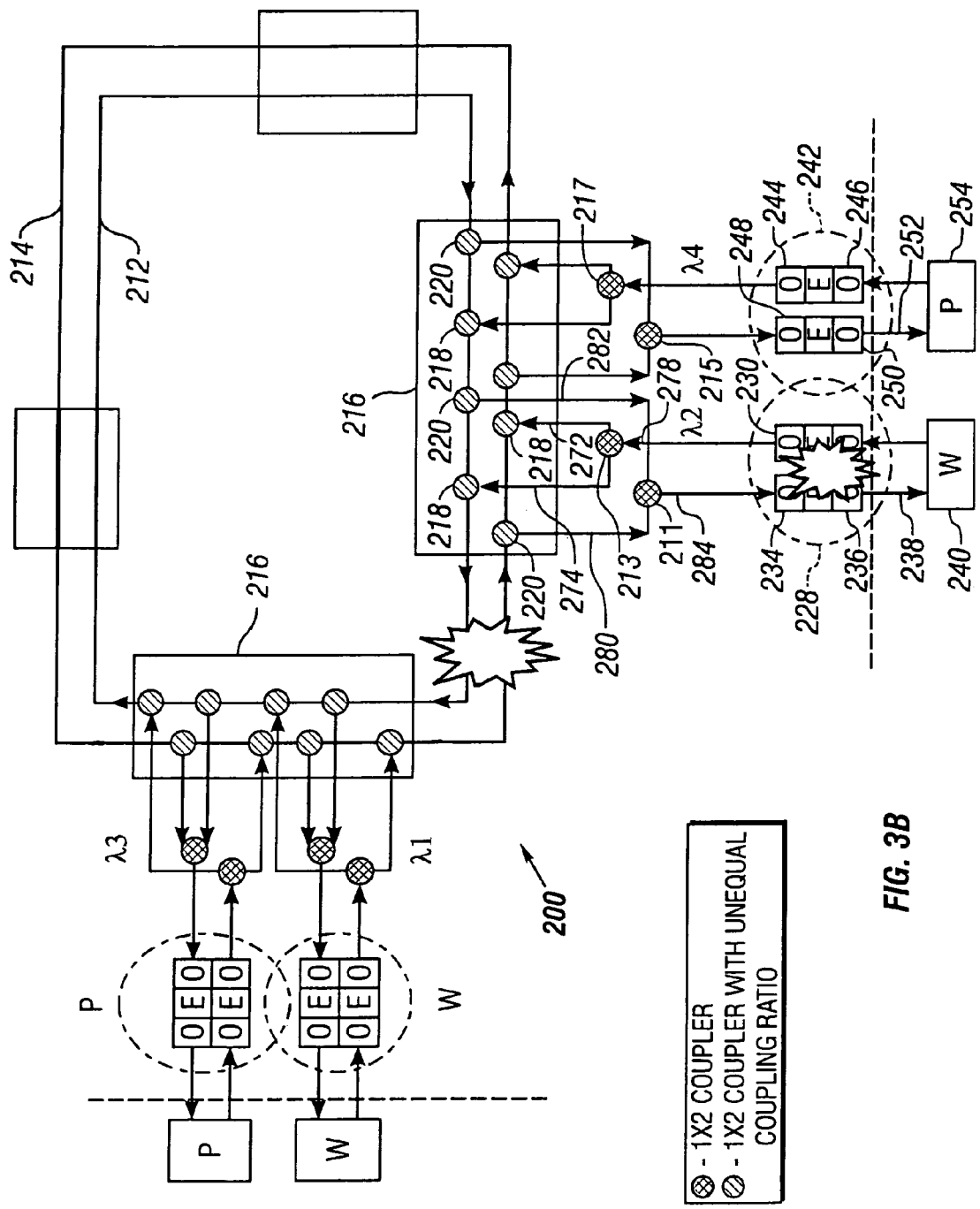
FIG. 3(b) illustrates recovery of the FIG. 3(a) all optical network after both a fiber break and WDM equipment failure.

FIG. 3(b) illustrates recovery of all optical network 200 after both a break of fiber 212 (or 214) and WDM equipment failure. The two switches in the hub are flipped from open to close position. Now in each node, owing to the fact that signals are received and transmitted in both directions, the fiber break is completely bypassed.

Figure 4A:
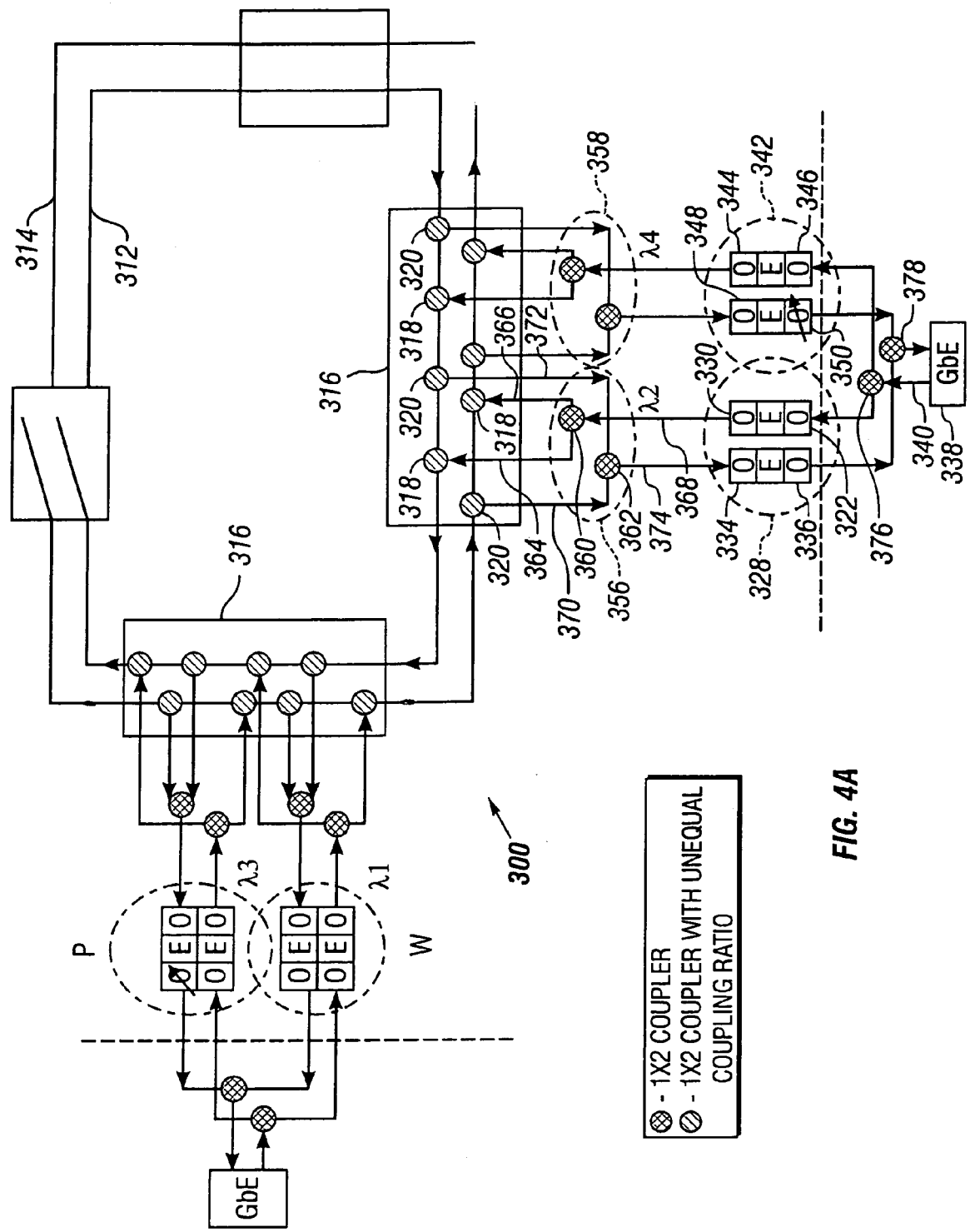
FIG. 4(a) illustrates one embodiment of an all optical network of the present invention that uses couplers in each node to protect WDM equipment and fibers in a ring.

In another embodiment of present invention, illustrated in FIG. 4(a), an all optical network 300 for optical signal traffic includes a first ring 310 with at least a first clockwise 312 and a second counter-clockwise fibers 314 and a plurality of network nodes 316. At most two pairs of add and drop broadband couplers 318 and 320 are positioned on each fiber 312 or 314. Each coupler 318 and 320 has first and second ports 322 and 324 for through traffic and a third port 326 for adding or dropping local traffic. First add and first drop broadband couplers 318 and 320 are configured to minimize a pass-through loss in first ring 310, and to ensure that he power levels of locally added wavelengths can be equalized to those of through-wavelengths.

A working WDM transponder 328 is coupled to first ring 310. Working WDM transponder 328 includes a line-side transmitter 330 and a client-side receiver 332 in a first direction, and a line-side receiver 334 and a client-side transmitter 336 in an opposing second direction. Client side transmitter 336 and client side receiver 332 of working WDM transponder 328 are connected back to back to a receiver 338 and a transmitter 340 of client equipment respectively.

A protection WDM transponder 342 is coupled to first ring 310. Protection WDM transponder 342 includes a line-side transmitter 344 and a client-side receiver 346 in a first direction, and a line-side receiver 348 and a client-side transmitter 350 in an opposing second direction. Client side transmitter 350 and client side receiver 346 of protection WDM transponder 342 are coupled to the receiver 338 and a transmitter 340 of client side equipment respectively.

First and second coupler pairs 356 and 358 are provided, each with first and second couplers 360 and 362. First coupler pair 356 is coupled to working WDM transponder 328 and second coupler pair 358 is coupled to protection WDM transponder 342. First coupler 360 has first and second output ports 364 and 366 and a first input port coupled 368 to WDM transponder line-side transmitter 330 (or 344). First output port 364 is coupled to clockwise fiber 312 and second output port 366 is coupled to counter-clockwise fiber 314. First coupler 360 enables WDM transponder line-side transmitter 330 (or 344) to launch signals to both clockwise and counter-clockwise fibers 312 and 314. Second coupler 362 has first and second input ports 370 and 372 and a first output port 374 coupled to WDM transponder line-side receiver 334 (or 348). First input port 364 is coupled to clockwise fiber 312 and second input port 366 is coupled to counter-clockwise fiber 314. Second coupler 362 enables WDM transponder line-side receiver 334 (or 348) receive signals from both clockwise and counter-clockwise fibers 312 and 314. Exactly the same arrangement is also installed for the working and protection WDM transponders, as shown in FIG. 4(a).

A 1×2 coupler 376 is configured to launch client optical signals to WDM working transponder 328 and WDM protection transponder 342. A 1×2 coupler 378 is configured to permit client equipment to receive signals from either working WDM transponder 328 or protection WDM transponder 342 because a client-side transmitter on WDM equipment is turned off to reduce coherent crosstalk and interference.

Figure 4B:
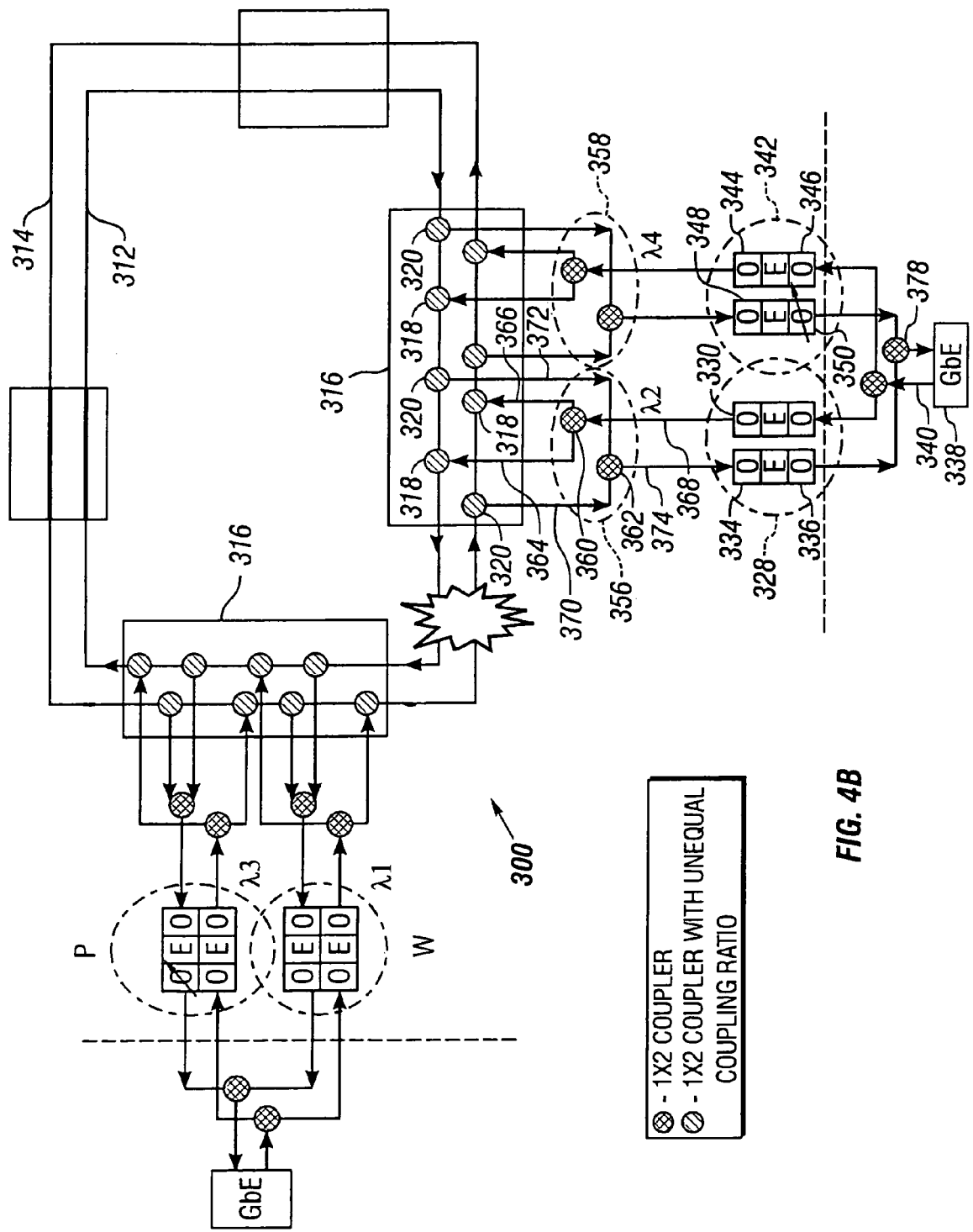
FIG. 4(b) illustrates recovery of the FIG. 4(a) all optical network after a fiber breaks.
Figure 4C:
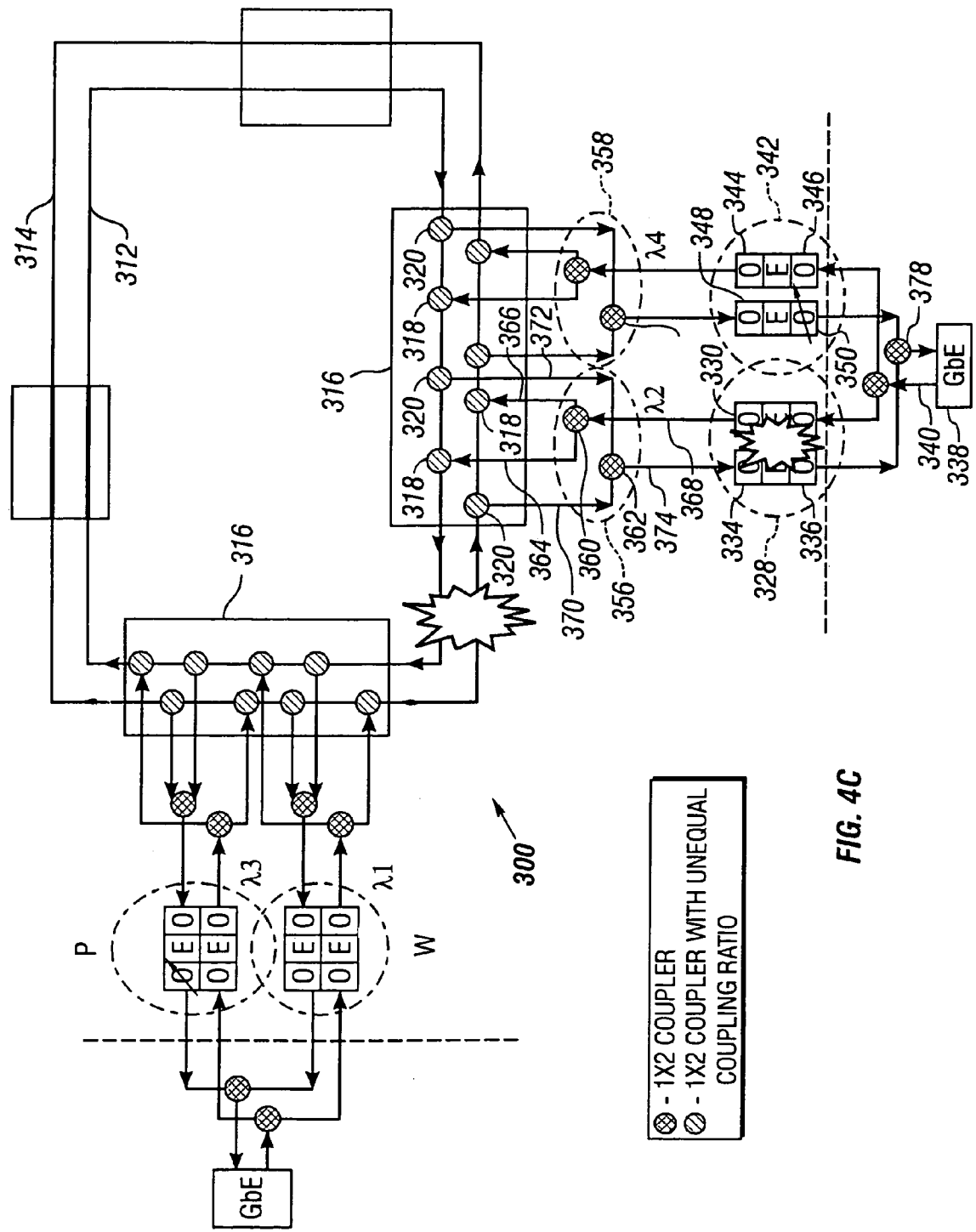
FIG. 4(c) illustrates recovery of the FIG. 4(a) all optical network after both a fiber break and WDM equipment failure.

FIG. 4(b) illustrates recovery of all optical network 300 after a break of fiber 312 or 314. FIG. 4(c) illustrates recovery of all optical network 300 after both a fiber break 312 or 314 and WDM equipment failure. Again, the two switches in the hub are closed under those conditions. Now in each node, owing to the fact that signals are received and transmitted in both directions, the fiber break is completely bypassed.

Figure 5A:
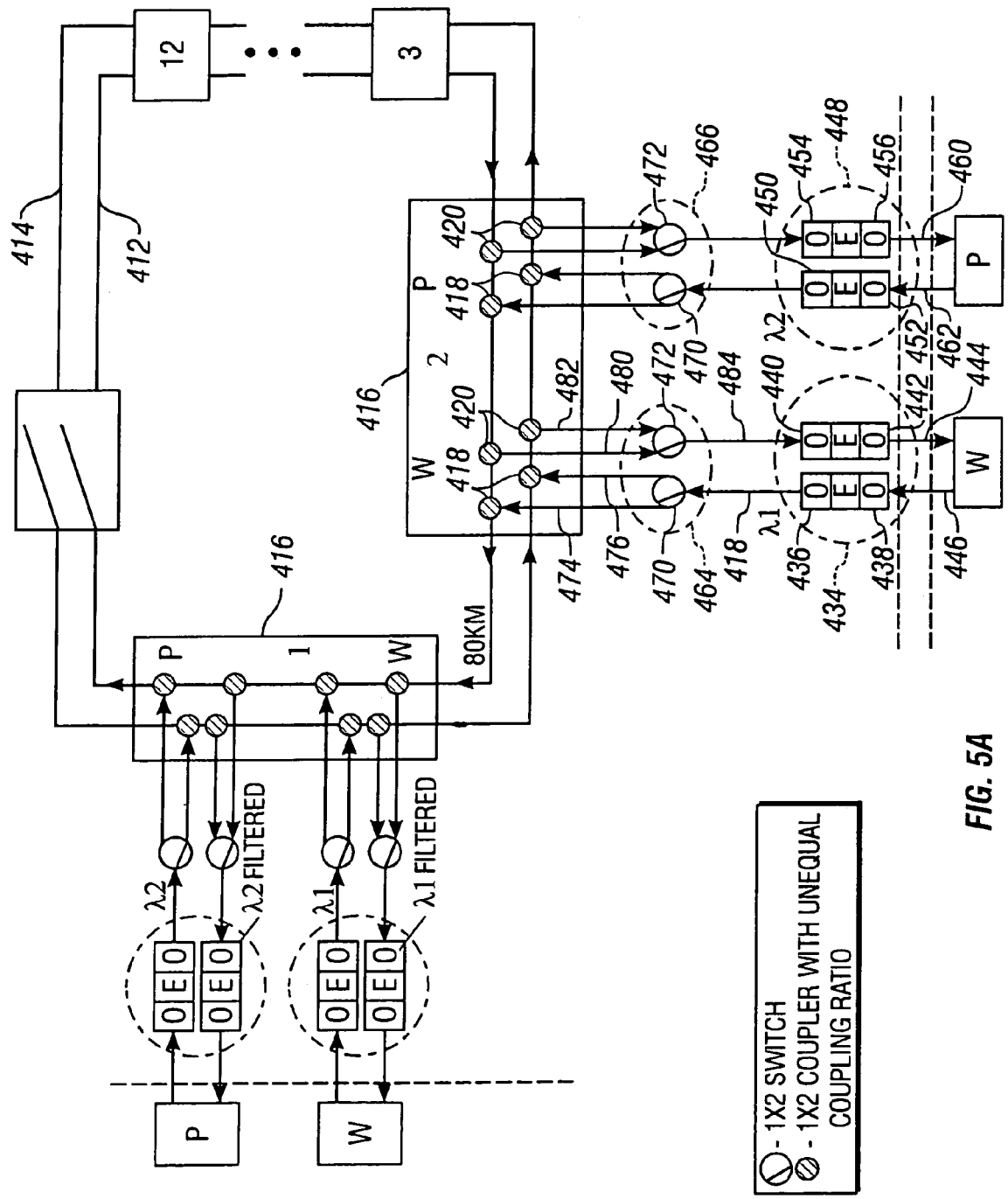
FIG. 5(a) illustrates one embodiment of an all optical network of the present invention that uses switches in each node to protect client side equipment, WDM equipment and fibers in a ring.

In another embodiment of present invention, illustrated in FIG. 5(a), an all optical network 400 for optical signal traffic has a first ring 410 with at least a first clockwise 412 and a second counter-clockwise fibers 414 and a plurality of network nodes 416. At most two pairs of broadband couplers 418 and 420 are coupled to each fiber 412 or 414. Each coupler 418 and 420 has first and second ports 422 and 424 for through traffic and a third port 426 for adding traffic to or from first ring 410.

A working WDM transponder 434 is coupled to first ring 410. Working WDM transponder 434 includes a line-side transmitter 436 and a client-side receiver 438 in a first direction, and a line-side receiver 440 and a client-side transmitter 442 in an opposing second direction. Client side transmitter 442 and client side receiver 438 of working WDM transponder 434 are connected back to back to a receiver 444 and a transmitter 446 of working client equipment respectively. An exactly the same arrangement is installed for protection WDM and client equipment, as shown in FIG. 5(a).

First and second switch pairs 464 and 466 are provided, each with first and second switches 470 and 472. First switch pair 464 is coupled to working WDM transponder 434 and second switch pair 466 is coupled to protection WDM transponder 448. First switch 470 has first and second output-ports 474 and 476 and a first input port 478 coupled to WDM transponder line-side transmitter 436. First output port 474 is coupled to clockwise fiber 412 and second output port 476 is coupled to counter-clockwise fiber 414. First switch 470 enables WDM transponder line-side transmitter 436 to launch signals to either clockwise or counter-clockwise fibers 412 and 414. Second switch 472 has first and second input ports 480 and 482 and a first output port 484 coupled to WDM transponder line-side receiver 440. First input port 480 is coupled to clockwise fiber 414 and second input port 482 is coupled to counter-clockwise fiber 412. Second switch 472 enables WDM transponder line-side receiver 440 to receive signals from either clockwise or counter-clockwise fibers 412 and 414.

Figure 5B:
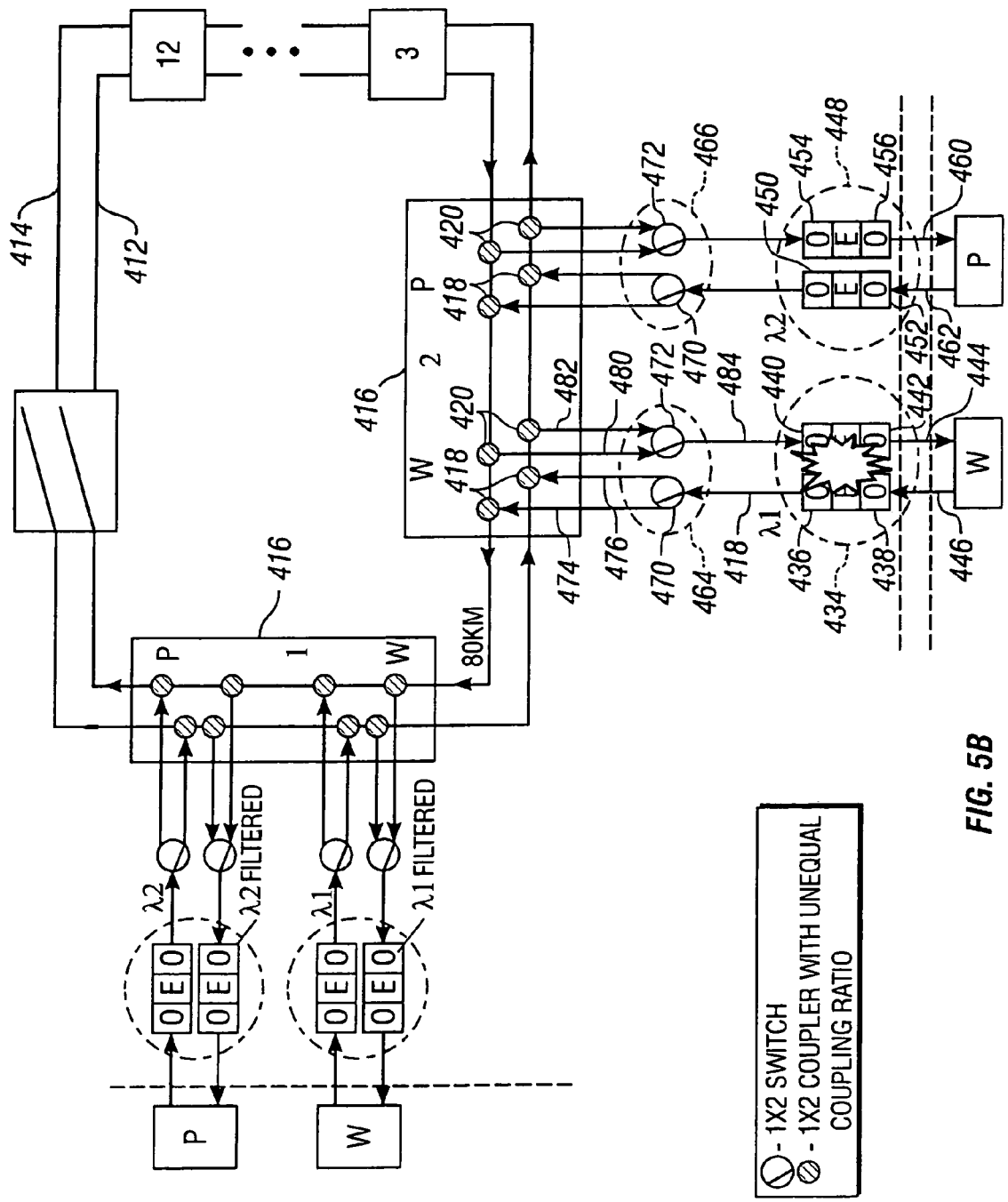
FIG. 5(b) illustrates recovery of the FIG. 5(a) all optical network of SONET equipment when WDM equipment fails.
Figure 5C:
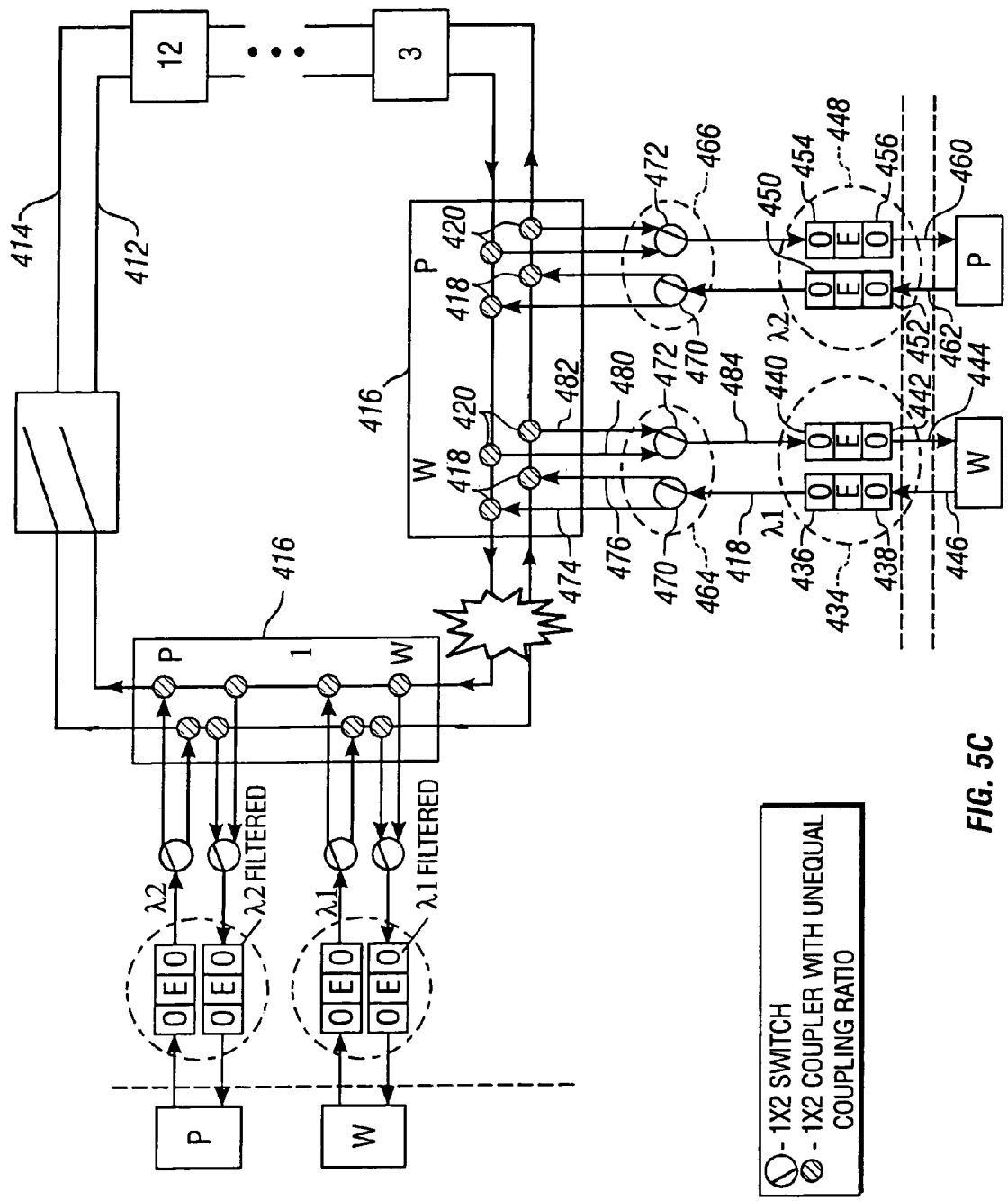
FIG. 5(c) illustrates recovery of the FIG. 5(a) all optical network after a fiber break.

FIG. 5(b) illustrates recovery of all optical network 400 of SONET equipment when WDM equipment fails. No switches are activated in this case. FIG. 5(c) illustrates recovery of all optical network 400 after a break of fiber 412 or 414. In this case, the switches in the hub are closed, and the switches in each node are switched to a different port to receive/transmit signals from/to a different direction.

Figure 6A:
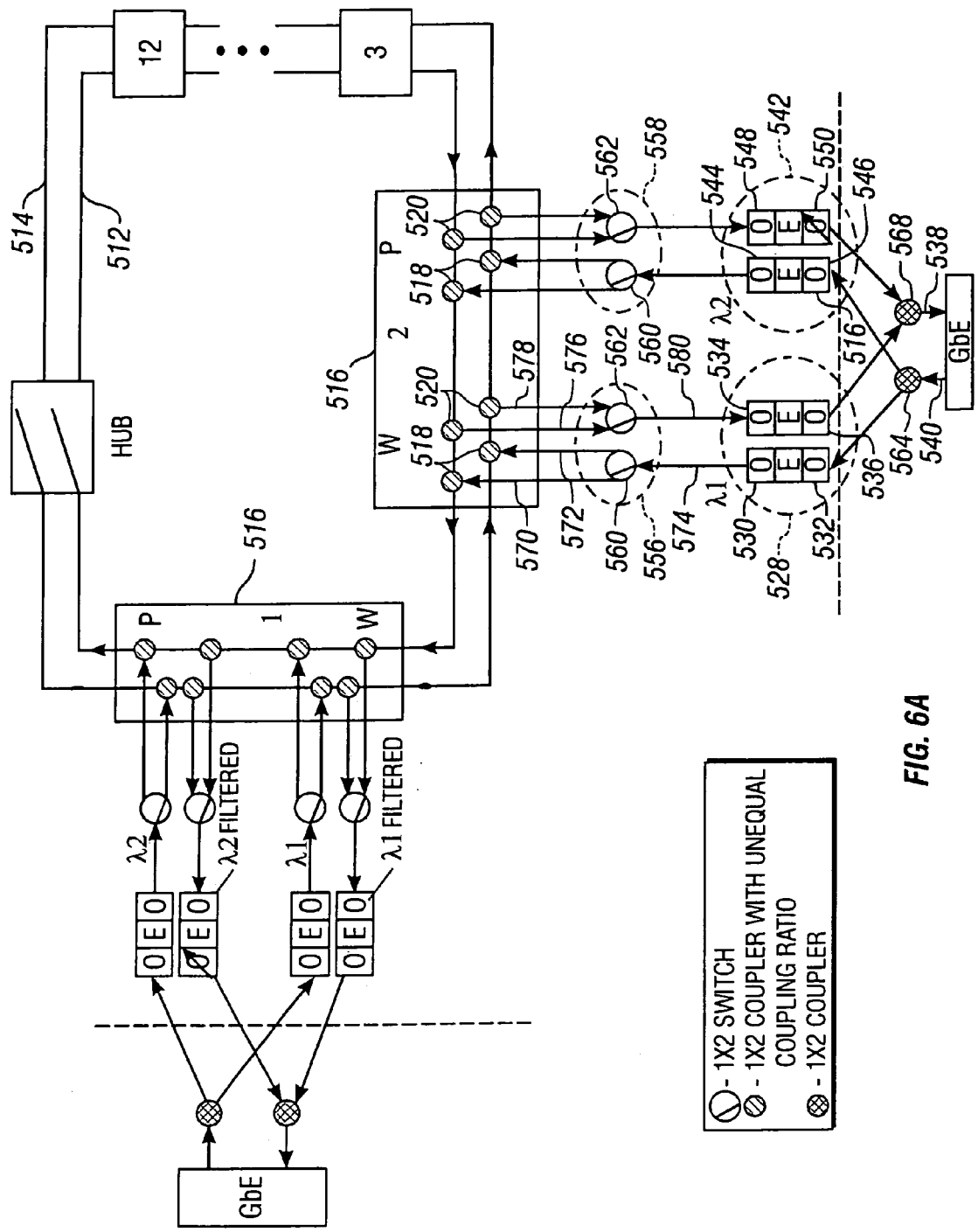
FIG. 6(a) illustrates one embodiment of an all optical network of the present invention that uses switches in each node to protect WDM equipment and fibers in a ring.

In another embodiment of present invention, illustrated in FIG. 6(a), an all optical network 500 for optical signal traffic has a first ring 510 with at least a first clockwise 512 and a second counter-clockwise fiber 514 and a plurality of network nodes 516. At most two pairs of broadband couplers 518 and 520 are coupled to each fiber. Each coupler 518 and 520 has first and second ports 522 and 524 for through traffic and a third port 526 for adding traffic to or from each fiber. First add and first drop broadband couplers 518 and 520 are positioned on each fiber and configured to minimize a pass-through loss in each fiber 512 and 514, and to ensure that power levels of locally added wavelengths can be equalized to those of through-wavelengths.

A working WDM transponder 528 is coupled to first ring 510. Working WDM transponder 528 includes a line-side transmitter 530 and a client-side receiver 532 in a first direction, and a line-side receiver 534 and a client-side transmitter 536 in an opposing second direction. Client side transmitter 536 and client side receiver 532 of working WDM transponder 528 are connected back to back to a receiver 538 and a transmitter 540 of client equipment. The same arrangement is installed at the protection WDM transponder 542, as shown in FIG. 6(a).

First and second switch pairs 556 and 558 are provided, each including first and second switches 560 and 562. A 1×2 coupler 564 is configured to launch client optical signals to WDM working transponder 528 and WDM protection transponder 542. A 1×2 coupler 568 is configured to permit client equipment to receive signals from either working WDM transponder 528 or protection WDM transponder 542, because a client-side transmitter on WDM equipment is turned off to reduce coherent crosstalk and interference.

First switch pair 556 is coupled to working WDM transponder 528 and second switch pair 558 is coupled to protection WDM transponder 542. First switch 560 has first and second output ports 570 and 572 and a first input port 574 coupled to WDM transponder line-side transmitter 530. First output port 570 is coupled to clockwise fiber 512 and second output port 572 is coupled to counter-clockwise fiber 514. First switch 560 enables WDM transponder line-side transmitter 530 to launch signals to either clockwise or counter-clockwise fibers 512 and 514. Second switch 562 has first and second input ports 576 and 578 and a first output 580 port coupled to WDM transponder line-side receiver 534. First input port 576 is coupled to counter-clockwise fiber 514 and second input port 578 is coupled to clockwise fiber 512. Second switch 562 enables WDM transponder line-side receiver 534 to receive signals from either clockwise or counter-clockwise fibers 512 and 514.

Figure 6B:
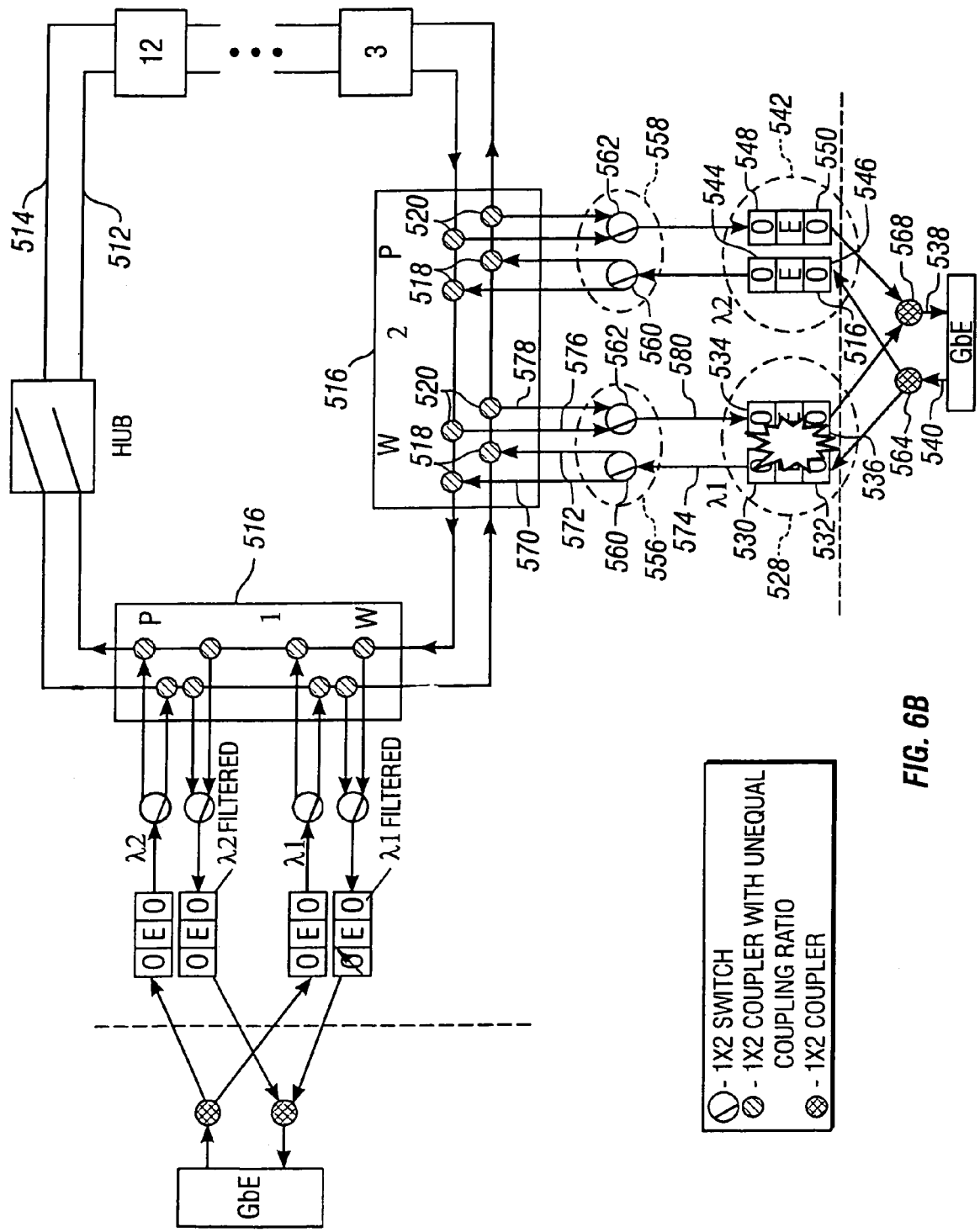
FIG. 6(b) illustrates recovery of the FIG. 6(a) all optical network when WDM equipment fails.
Figure 6C:
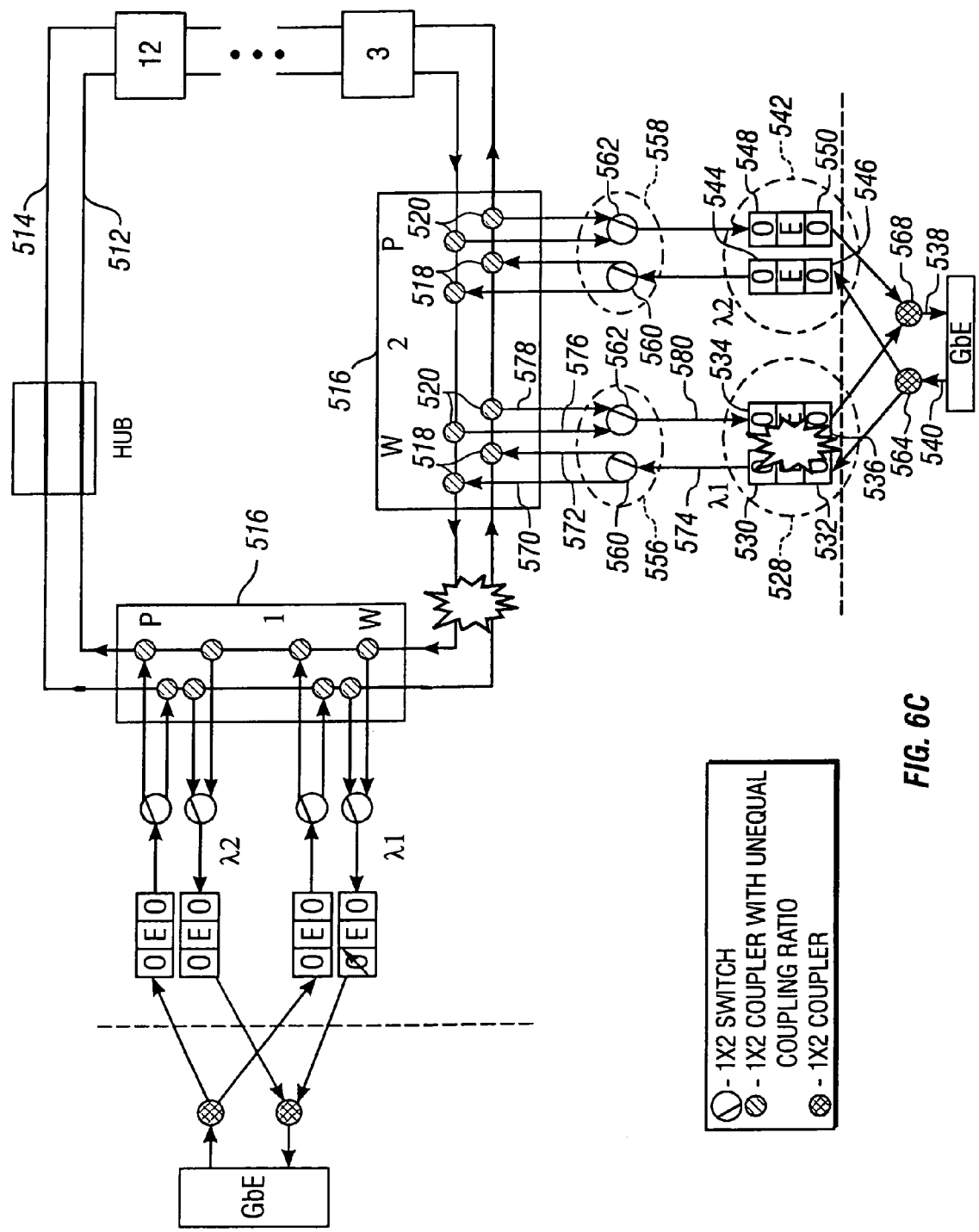
FIG. 6(c) illustrates recovery of the FIG. 6(a) all optical network when there is both a fiber break and a failure of WDM equipment.

FIG. 6(b) illustrates recovery of all optical network 500 when WDM equipment fails and no switches are activated. FIG. 6(c) illustrates recovery of all optical network 500 when there is both a break of a fiber 512 or 514 and a failure of WDM equipment. In this embodiment, the switches in the hub are closed, and the switches in each node are switched to a different port.

Figure 7A:
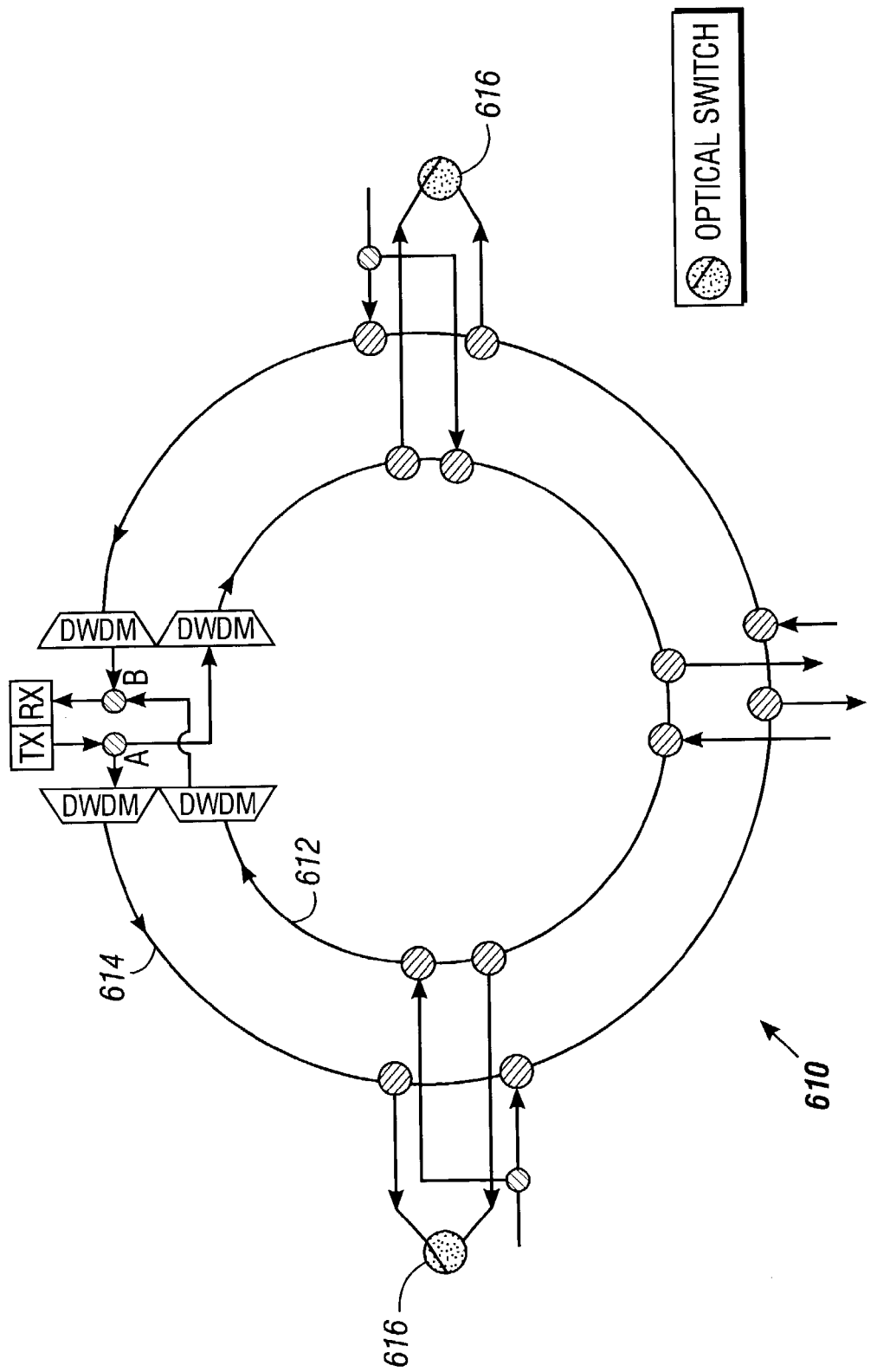
Figure 7B:
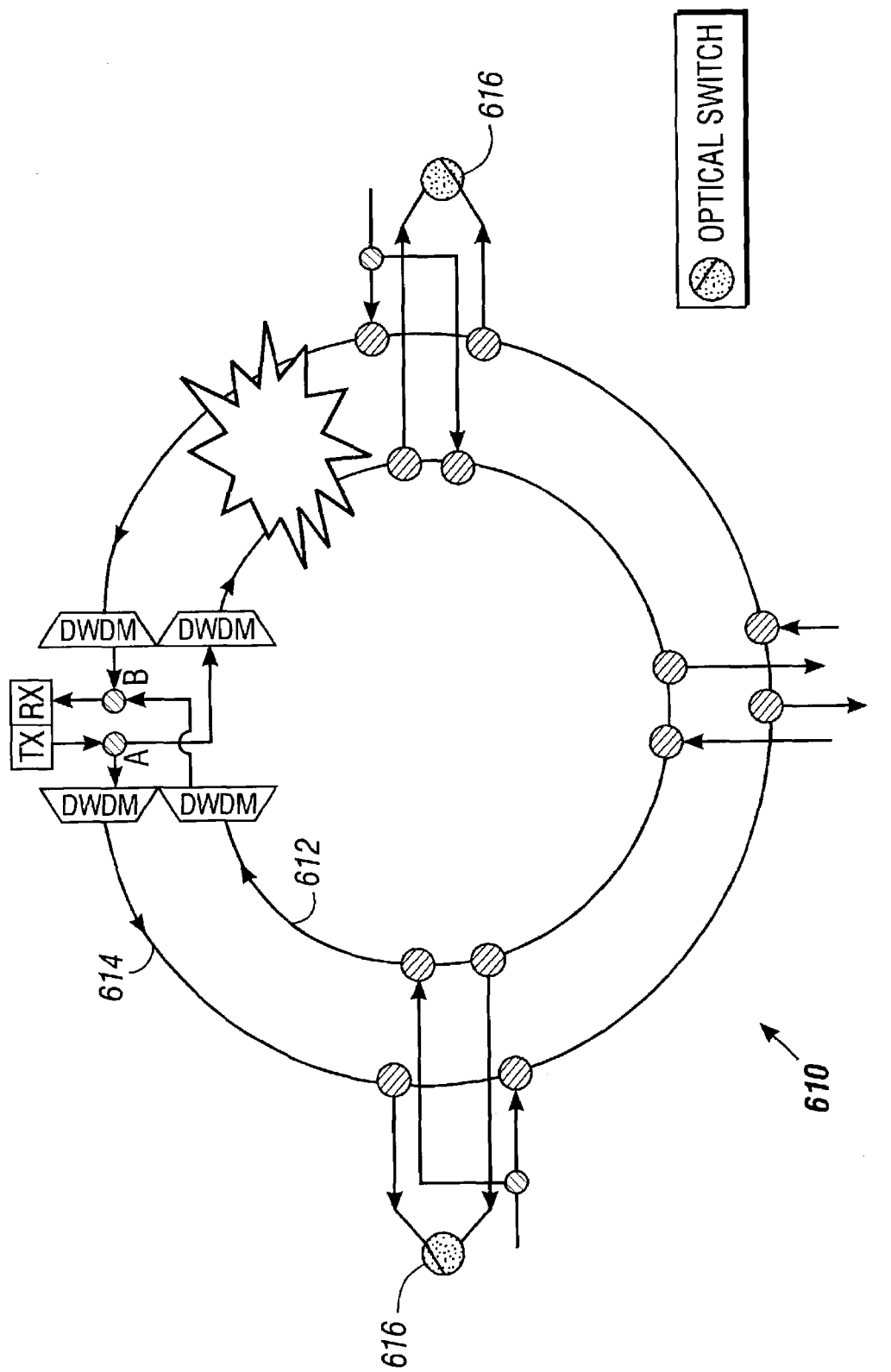
FIG. 7(b) illustrates a break in the FIG. 7(a) network.

Referring now to FIG. 7(a), ring 610 is provided. When the transmitted signal in the central location is sent simultaneously to fibers 612 and 614, a 1×2 switch 616 can be located at every node so that the receiver receives either fiber 612 or 614. In the event of a break in a fiber 612 or 614, a WDM transponder senses the loss of optical power or a high bit-error-rate, and sends a control signal to trigger the local 1×2 optical switch 616 to switch to a different port, as shown in FIG. 7(b). In network architecture of FIG. 7(a) and 7(b), there are no open switches, as distinguished from the embodiments of FIGS. 1(a)-6(c), on fibers 612 and 614, because the central location has electronic termination which breaks ring 610.

The embodiments of FIGS. 7(a) and 7(b) can also be configured such that the transmitter in the central hub is connected to a 1×2 switch rather than a 1×2 coupler, and the receiver in each node is connected to a 1×2 coupler rather than a 1×2 switch.

Figure 8A:
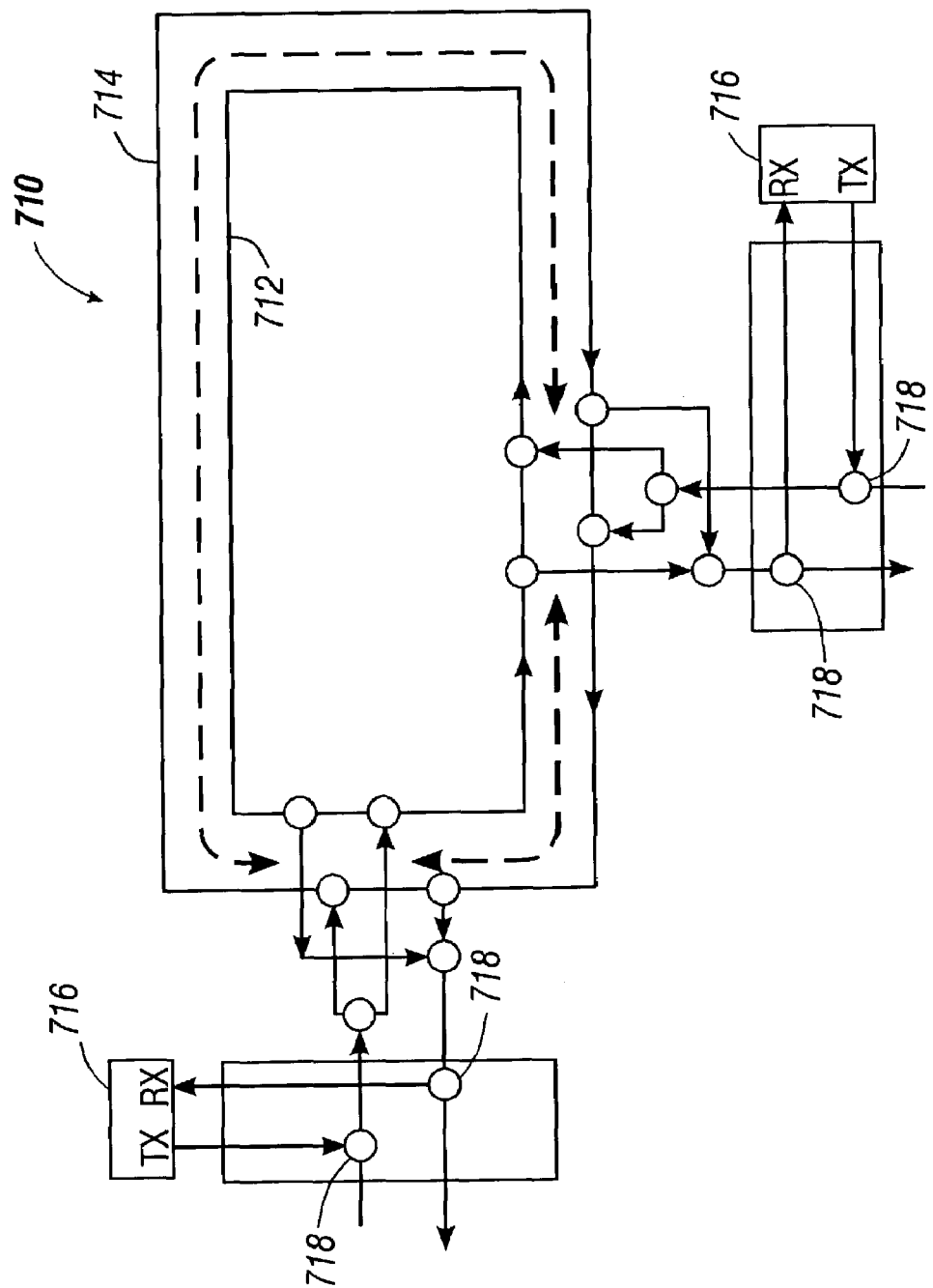
FIG. 8(a) illustrates one embodiment of an all-passive optical ring network with broadband/band optical couplers on a ring as add-drop units, and narrowband OAD off the ring.
Figure 8B:
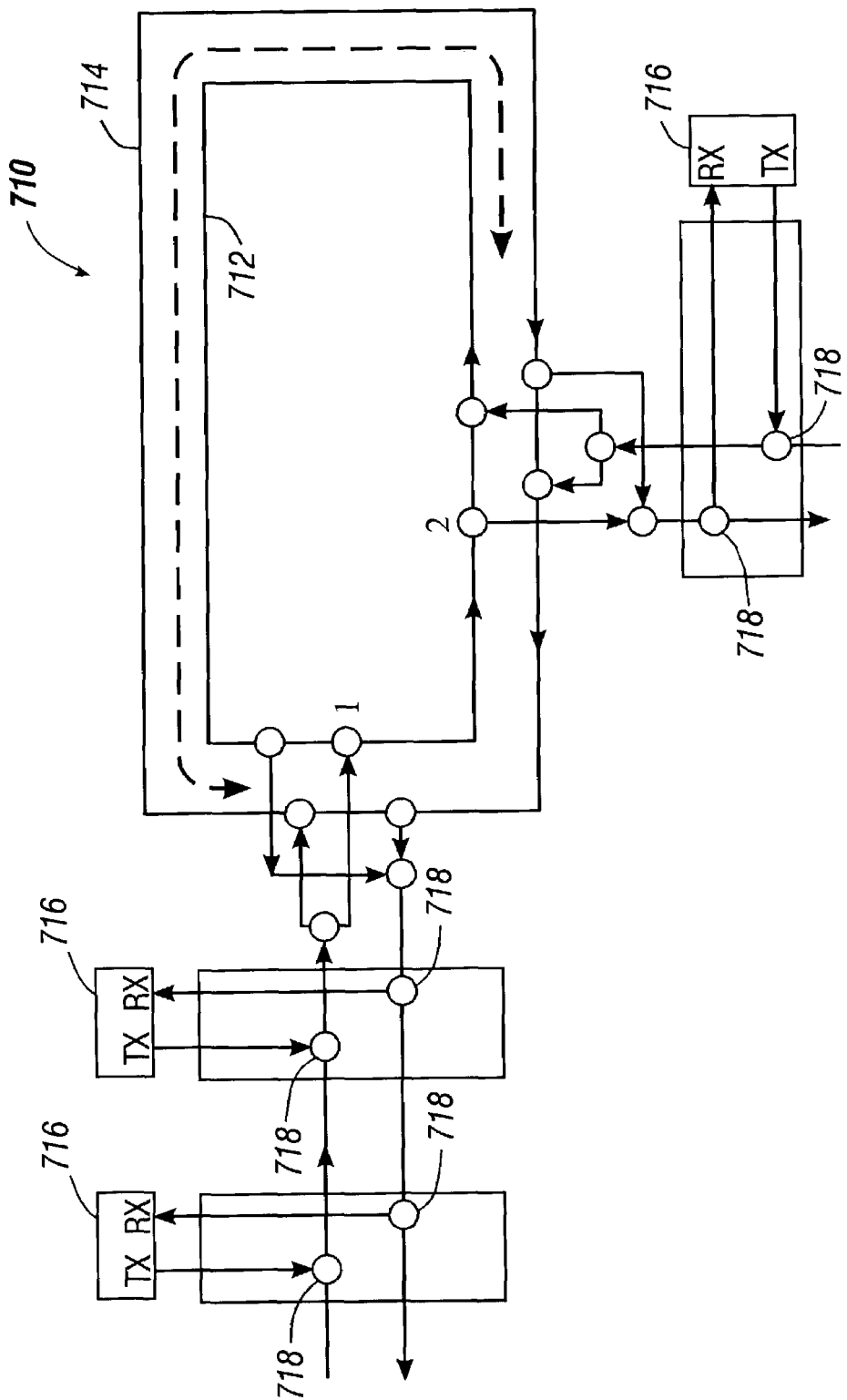
FIG. 8(b) illustrates another embodiment of the FIG. 8(a) network with linecards added in series.
Figure 8C:
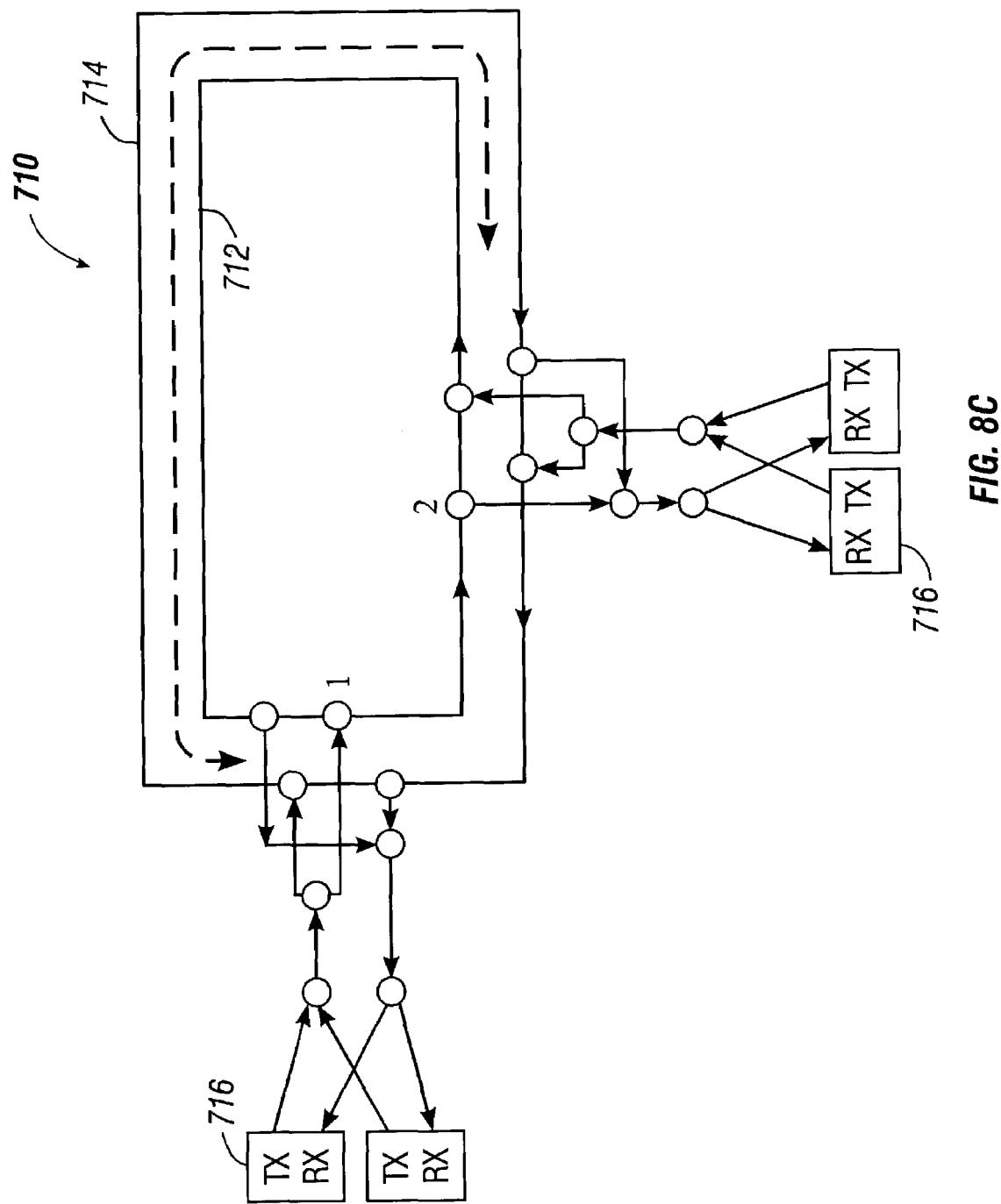
FIG. 8(c) illustrates another embodiment of the FIG. 8(a) network with linecards added in parallel.

In another embodiment of the present invention, illustrated in FIGS. 8(a)-8(c), an all-passive broadcast and select ring network 710 is provided, with fibers 712 and 714, that is based generally on the same principle as that in FIGS. 1(a)-6(c) embodiments. In the FIGS. 8(a)-8(c) embodiment, all-passive ring 710 requires that a round-trip transmission loss must be kept at a certain level so that the recirculated signal does not cause a significant coherent cross-talk penalty. In this embodiment, open switches are not required, as distinguished from the embodiments of FIGS. 1(a)-6(c). However, the near-end/far-end adjacent cancel cross-talk is avoided by designing all optical add-drop filters with sharp enough roll-offs. This is a condition that can occur when a node receives signals from both a neighbor node, which sends a strong signal, and a remote node, which sends a weak signal. This condition also occurs where these two signals are adjacent to each other in terms of wavelength.

In FIG. 8(b), multiple WDM transponders 716 in each node are combined in series by using cascaded optical add-drop filters (OAD's) 718 in both the add and drop directions. In the FIG. 8(c) embodiment, multiple WDM transponders 716 in each node are combined by multi-port broadband power combiners in parallel.

Figure 9A:
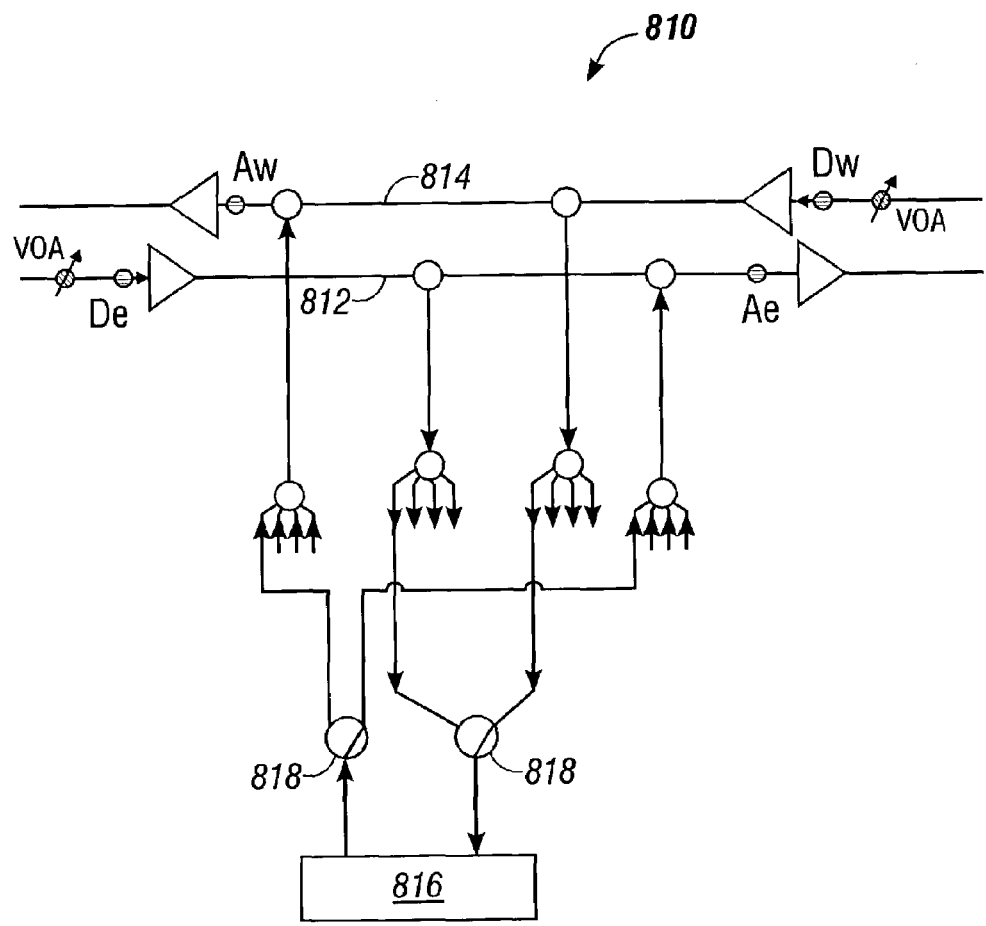
FIG. 9(a) is similar to the FIG. 2(a) embodiment except that four WDM transponders per node are provided, and protections switches are triggered by the bit-error-rate of each transponder.
Figure 9B:
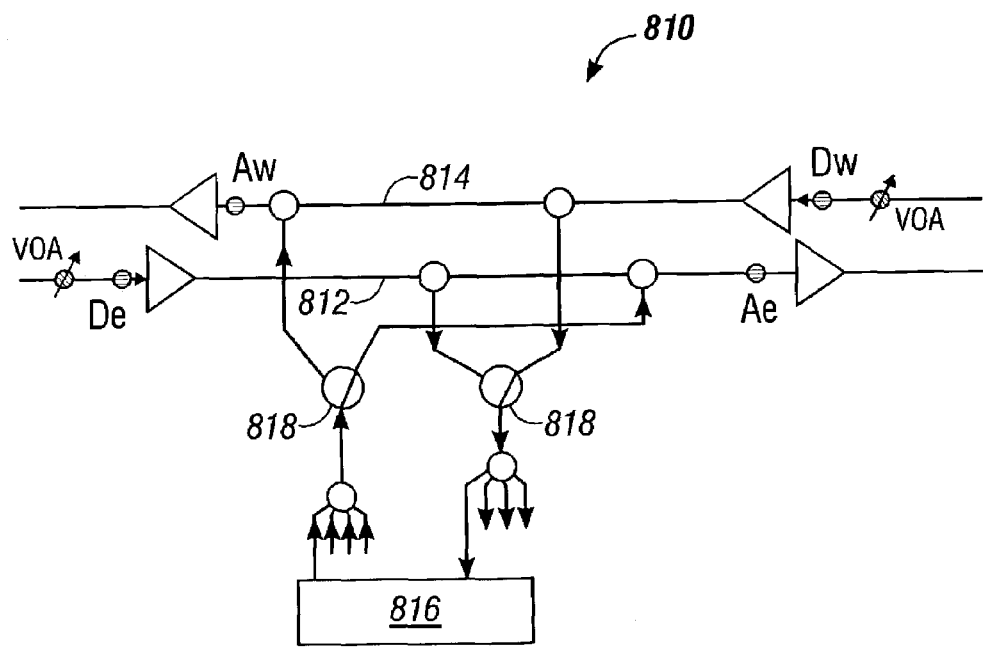
FIG. 9(b) is similar to the FIG. 9(b) embodiment except that protection switches are triggered by the locally received optical power from the ring.
Figure 9C:
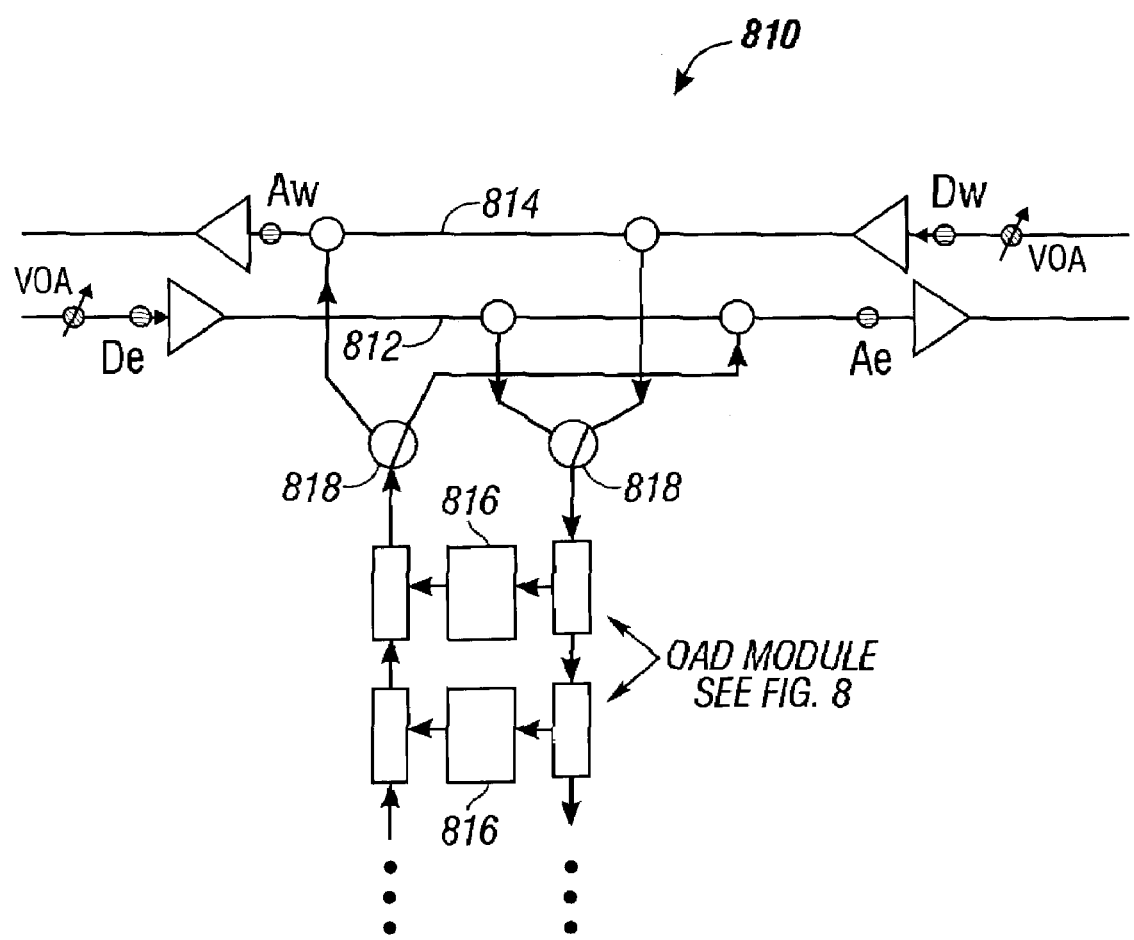
FIG. 9(c) is the same as FIG. 9(b) except that WDM wavelengths are added in series rather than in parallel.

The embodiment or ring 810 with fibers 812 and 814, illustrated in FIG. 9(a) and 9(b), is similar to FIGS. 2(a) and 2(b) except that four WDM transponders 816 per node are utilized. In this embodiment, each WDM transponder 816 has its own optical protection switch pair 818. Each switch pair 818 is triggered by the high bit-error-rate in the corresponding WDM transponder 816. Each WDM transponder 816 shares the same protection switch pair 818 in each node. Switch pairs 818 is triggered by the locally received optical power from ring 810. FIG. 9(c) is the same as FIG. 9(b), except that WDM wavelengths are added in series rather than in parallel.

FIGS. 9(a) through 9(c) also illustrate where and how all the wavelengths on ring 810 are equalized. At each node, there are four reference points $A_W$, $A_E$, $D_W$, and $D_E$ at the input of fibers 812 and 814, in-line amplifiers. Reference points $D_W$ and $D_E$ are where all wavelengths arriving from a previous node must be adjusted to a fixed level by using the variable optical attenuator (VOA). This fixed level is to ensure that the drop in-line amplifier is operating in a linear region, and that the amplifier signal-spontaneous noise is not be a limiting factor. Reference points $A_W$ and $A_E$ are where the power levels of all through- and the locally added wavelengths must be equalized. Locally added wavelength power level can be adjusted by a VOA or a similar device.

If the inter-node distance is very short, the drop amplifier or both amplifiers in each node in each direction can be eliminated. If only the drop amplifier is eliminated, the only reference point needed in each direction then is at the input of the add amplifier. If both amplifiers in each node are eliminated, then the locally added wavelength power should be equalized at the next node where there is an inline amplifier.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

What is claimed is:

1. An all optical network for optical signal traffic, comprising:
   a first ring with at least a first clockwise fiber, a second counter-clockwise fiber and a plurality of network nodes; each node including at least a WDM transponder that includes a line-side transmitter and a client-side receiver in a first direction, and a line-side receiver and a client-side transmitter in an opposing second direction; the line-side receiver including a fixed or a tunable optical wavelength filter;
   at least a first add and a first drop broadband or narrowband couplers positioned on each fiber, each coupler having first and second ports for through traffic and a third port for adding or dropping local traffic, the first add and first drop broadband couplers being configured to minimize a pass-through loss in each fiber;
   a first coupler pair including first and second couplers in each network node, the first coupler having first and second output ports and a first input port coupled to a line-side transmitter, the first output port being coupled to the clockwise fiber and the second output port being coupled to the counter-clockwise fiber; the first coupler enabling the line-side transmitter to launch signals to both the clockwise and counter-clockwise fibers; the second coupler having first and second input ports and a first output port coupled to a line-side receiver, the first input port being coupled to the clockwise fiber and the second input port coupled to the counter-clockwise fiber; the second coupler enabling the line-side receiver to receive signals from both the clockwise and counter-clockwise fibers; and
   a single hub switch coupled in the first clockwise and second counter-clockwise fibers as a central protection switch to open an optical break point in each of the first clockwise and second counter-clockwise fibers when there is no other break point in the first clockwise and second counter-clockwise fibers and to close the optical break point when there is a break point in at least one of the first clockwise and second counter-clockwise fibers.

2. The network of claim 1, wherein each of the broadband couplers on the ring is used in combination with one or more optical amplifiers configured to compensate for add/drop loss on the first ring.

3. The network of claim 2, wherein an input of each in-line amplifier is at a position where power levels of all wavelengths are equalized.

4. The network of claim 1, farther comprising:
   one or more WDM transponders at each node.

5. The network of claim 4, wherein the one or more WDM transponders in each node are combined by one or more multi-port broadband power combiners.

6. The network of claim 4, wherein the one or more WDM transponders in each node are cascaded in series through narrowband optical add-drop filters.

7. The network of claim 1, wherein the first ring includes a plurality of nodes.

8. The network of claim 1, wherein the network is a passive optical network without in-line optical amplifiers and optical switches.

9. The network of claim 1, wherein the network is a non-passive network with at least one in-line optical amplifier.

10. The all optical network of claim 9, wherein at least one of the clockwise fiber or the counter-clockwise fiber is a working fiber, and the other is a protection fiber, wherein optical signal traffic travels in a clockwise direction in the clockwise fiber and in a counter-clockwise direction in the counter-clockwise fiber.

11. The network of claim 10, further comprising:
a central hub node in which the single hub switch is located.

12. The network of claim 11, wherein the central hub node includes at least one 1×2 switch to couple transmitter power to at least one of the working fiber or the protection fiber.

13. The network of claim 12, further comprising:
a 1×2 coupler at a receiving end at each node to receive signals from the working and protection fibers.

14. The network of claim 11, wherein the central hub includes at least a 1×2 coupler to couple transmitter power to the working and protection fibers.

15. The network of claim 11, wherein each node at the receiving end includes a 1×2 switch to receive a transmitter signal from at least one of the working or protection fibers.

16. The network of claim 11, wherein the central hub node includes at least one of a wavelength combining or a splitting device.

17. The network of claim 16, wherein the wavelength combining or splitting device includes at least a pair of 1×N DWDM multiplexers, at least a pair of 1×N DWDM demultiplexers, and at least one transponder coupled to the first working fiber and the first protection fiber.

18. The network of claim 9, wherein a pair of open 1×1 switches are maintained on the working and protection fibers on the first ring to reduce a fiber ring lasing phenomenon in response to gain provided by in-line amplifiers coupled to the first ring.

19. The network of claim 1 further comprising at least one of, a wavelength-dependent fixed filter or a tunable filter, in front of the line-side receiver to filter light received by the line-side receiver.

20. An all optical network for optical signal traffic, comprising:
a first ring with at least a clockwise and a counter-clockwise fibers and a plurality of network nodes;
at least a first add and a first drop broadband couplers positioned on each fiber, each coupler having first and second ports for through traffic and a third port for adding or dropping local traffic, the first add and first drop broadband couplers being configured to minimize a pass-through loss in each fiber; and
a working WDM transponder coupled to the first ring, the working WDM transponder including a line-side transmitter and a client-side receiver in a first direction, and a line-side receiver and a client-side transmitter in an opposing second direction, the client side transmitter and the client side receiver of the working WDM transponder being coupled to a receiver and a transmitter of the working client side equipment respectively;
a protection WDM transponder coupled to the first ring, the protection WDM transponder including a line-side transmitter and a client-side receiver in a first direction, and a line-side receiver and a client-side transmitter in an opposing second direction, the client side transmitter and the client side receiver of the protection WDM transponder being coupled to a receiver and a transmitter of the protection client side equipment respectively; and
first and second coupler pairs, each pair including first and second couplers, the first coupler pair coupled to the working WDM transponder and the second coupler pair coupled to the protection WDM transponder, the first coupler having first and second output ports and a first input port coupled to the WDM transponder line-side transmitter, the first output port being coupled to the clockwise fiber and the second output port being coupled to the counter-clockwise fiber; the first coupler enabling the WDM transponder line-side transmitter to launch signals to both the clockwise and counter-clockwise fibers, the second coupler having first and second input ports and a first output port coupled to the WDM transponder line-side receiver, the first input port being coupled to the clockwise fiber and the second input port being coupled to the counter-clockwise fiber; the second coupler enabling the WDM transponder line-side receiver to receive signals from both the clockwise and counter-clockwise fibers; and
a single hub switch coupled in the first clockwise and second counter-clockwise fibers as a central protection switch to open an optical break point in each of the first clockwise and second counter-clockwise fibers when there is no other break point in the first clockwise and second counter-clockwise fibers and to close the optical break point when there is a break point in at least one of the first clockwise and second counter-clockwise fibers.

21. The network of claim 20, further comprising:
one or more WDM transponders at each node.

22. The network of claim 21, wherein the one or more WDM transponders at each node are combined by one or more multi-port broadband power combiners.

23. The network of claim 21, wherein the one or more WDM transponders at each node are cascaded in series through narrowband optical add-drop filters.

24. An all optical network for optical signal traffic, comprising:
a first ring with at least a first clockwise and a second counter-clockwise fibers and a plurality of network nodes;
at least a first add and a first drop broadband or narrowband couplers positioned on each fiber, each coupler having first and second ports for through traffic and a third port for adding or dropping local traffic, the first add and first drop broadband couplers being configured to minimize a pass-through loss in each fiber;
a working WDM transponder coupled to the first ring, the working WDM transponder including a line-side transmitter and a client-side receiver in a first direction, and a line-side receiver and a client-side transmitter in an opposing second direction, the client side transmitter and the client side receiver of the working WDM transponder connected back to back to a receiver and a transmitter of working client equipment respectively;
a protection WDM transponder coupled to the first ring, the protection WDM transponder including a line-side transmitter and a client-side receiver in a first direction, and a line-side receiver and a client-side transmitter in an opposing second direction, the client side transmitter and the client side receiver of the protection WDM transponder coupled to a receiver and a transmitter of the protection client side equipment respectively;
first and second coupler pairs, each pair including first and second couplers, the first coupler pair coupled to the working WDM transponder and the second coupler pair coupled to the protection WDM transponder, the first coupler having first and second output ports and a first input port coupled to the WDM transponder line-side transmitter, the first output port being coupled to the clockwise fiber and the second output port being coupled to the counter-clockwise fiber; the first coupler enabling the WDM transponder line-side transmitter to launch signals to both the clockwise and counter-clockwise fibers, the second coupler having first and second input ports and a first output port coupled to the WDM transponder line-side receiver, the first input port being coupled to the clockwise fiber and the second input port being coupled to the counter-clockwise fiber; the second coupler enabling the WDM transponder line-side receiver to receive signals from both the clockwise and counter-clockwise fibers;

a 1×2 coupler configured to launch client optical signals to the WDM working transponder and the WDM protection transponder;

a 1×2 coupler configured to permit client equipment to receive signals from either the working WDM transponder or the protection WDM transponder, wherein a client-side transmitter on the WDM equipment is turned off to reduce coherent crosstalk and interference; and a single hub switch coupled in the first clockwise and second counter-clockwise fibers as a central protection switch to open an optical break point in each of the first clockwise and second counter-clockwise fibers when there is no other break point in the first clockwise and second counter-clockwise fibers and to close the optical break point when there is a break point in at least one of the first clockwise and second counter-clockwise fibers.

25. The network of claim 24, further comprising:
one or more WDM transponders at each node.

26. The network of claim 25, wherein the one or more WDM transponders at each node are combined by one or more multi-port broadband power combiners.

27. The network of claim 25, wherein the one or more WDM transponders at each node are cascaded in series through narrowband optical add-drop filters.

28. An optical communication system, comprising:
a ring network comprising a first fiber ring to carry clockwise optical signals, a second fiber ring to carry counter-clockwise optical signals, and a plurality of network nodes coupled to send light to and to receive light from each of the first and second fiber rings, wherein each network node comprises:
a first pair of optical couplers coupled to the first and second fiber rings, respectively, to add at least one optical add signal to the first and second fiber rings, respectively, and to transmit optical signals in the first and second fiber rings, a node add means for directing the optical add signal into the first pair of optical couplers, a second pair of optical couplers coupled to the first and second fiber rings, respectively, to drop at least one portion of light from each of the first and second fiber rings, respectively, as an optical drop signal and to transmit remaining light in the first and second fiber rings, where the optical drop signal and the optical add signal are at different optical wavelengths, a node drop means for receiving the optical drop signal from the second pair of optical couplers as a drop signal, and a node transponder to produce the optical add signal to the node add means and to receive the drop signal from the node drop means; and wherein the ring network further comprises:
a single hub switch coupled in the first and second fiber rings as a central protection switch to open an optical break point in each of the first and second fiber rings when there is no other break point in the first and second fiber rings and to close the optical break point when there is a break point in at least one of the first and second fiber rings.

29. The system as in claim 28, wherein the node add means comprises a first optical coupler and the node drop means comprises a second optical coupler.

30. The system as in claim 28, wherein each network node further comprises a protection equipment in communication with the first and second fiber rings to provide redundancy protection of the network node in communication with the ring network, wherein the protection equipment comprises:

a first pair of protection optical couplers coupled to the first and second fiber rings, respectively, to add at least one optical add signal to the first and second fiber rings, respectively, and to transmit optical signals in the first and second fiber rings, a protection equipment add means for directing the optical add signal into the first pair of add optical couplers, a second pair of protection optical couplers coupled to the first and second fiber rings, respectively, to drop at least one optical drop signal from the first and second fiber rings, respectively, and to transmit other optical signals the first and second fiber rings, a protection equipment drop means for receiving the optical add signal from the second pair of add optical couplers as a drop signal, and a protection equipment transponder to produce the optical add signal to the node add optical coupler and to receive the drop signal from the node drop optical coupler.

31. The system as in claim 30, wherein the node transponder is coupled to client side working equipment to add a client side add signal to the first and second fiber rings and to drop a client side drop signal to the client side working equipment, and wherein the protection equipment transponder is coupled to client side protection equipment different from the client side working equipment to add the client side add signal to the first and second fiber rings and to drop the client side drop signal to the client side protection equipment as a protection against a communication failure with the client side working equipment.

32. The system as in claim 31, wherein each of the node transponder and the protection equipment transponder comprises:

a line-side transmitter to produce the optical add signal to the node add means;

a client-side receiver to receive a client input signal;

a line-side receiver to receive the drop signal from the node drop means; and a client-side transmitter to send a client output signal, wherein the client side transmitter and the client side receiver are connected to a receiver and a transmitter of the client equipment, respectively.

33. The system as in claim 30, wherein each network node further comprises:

a client side add optical coupling element to couple a first part of a client side optical add signal from client side equipment to the node transponder and a second part of the client side optical add signal to the protection equipment transponder; and a client side drop optical coupling element to couple a first client side optical drop signal from the node transponder to the client side equipment and a second client side optical drop signal from the protection equipment transponder to the client side equipment.

34. The system as in claim 33, wherein each of the node transponder and the protection equipment transponder comprises:
- a line-side transmitter to produce the optical add signal to the node add means;
- a client-side receiver to receive a client input signal;
- a line-side receiver to receive the drop signal from the node drop means; and
- a client-side transmitter to send a client output signal, wherein the client side transmitter and the client side receiver are connected to a receiver and a transmitter of the client equipment, respectively.

35. The system as in claim 28, wherein the node transponder comprises:
- a line-side transmitter to produce the optical add signal to the node add means;
- a client-side receiver to receive a client input signal;
- a line-side receiver to receive the drop signal from the node drop means; and
- a client-side transmitter to send a client output signal, wherein the client side transmitter and the client side receiver are connected to a receiver and a transmitter of client equipment, respectively.

36. An optical communication system, comprising:
- a ring network comprising a first fiber ring to carry clockwise optical signals, a second fiber ring to carry counter-clockwise optical signals, a plurality of network nodes coupled to send light to and to receive light from each of the first and second fiber rings, and a single hub switch coupled in the first and second fiber rings to provide a central protection switching in the ring network,
- wherein the single hub switch is controlled to open an optical break point in each of the first and second fiber rings when there is no other break point in the first and second fiber rings and to close the optical break point when there is a break point in at least one of the first and second fiber rings, and
- wherein each network node is coupled to the first and second fiber rings to broadcast information to the ring network and to selectively receive information from the ring network, and
- wherein each network node comprises:
- a pair of add optical couplers coupled to the first and second fiber rings, respectively, to add at least one optical add signal to the first and second fiber rings, respectively, and to transmit light in the first and second fiber rings,
- a node add element configured to direct the optical add signal into the pair of add optical couplers,
- a pair of drop optical couplers coupled to the first and second fiber rings, respectively, to drop at least one portion of light from each of the first and second fiber rings, respectively, as an optical drop signal and to transmit remaining light in the first and second fiber rings, where the optical drop signal and the optical add signal are at different optical wavelengths,
- a node drop element configured to receive the optical drop signal from the pair of drop optical couplers as a drop signal, and
- a node transponder to produce the optical add signal to the node add element and to receive the drop signal from the node drop element,
- wherein each network node does not have an optical switch to generate a physical break point in the first and second fiber rings.

37. The system as in claim 36, wherein the node transponder comprises a tunable optical filter that selects a wavelength of light in the drop optical signal and selectively detects an optical signal at the selected wavelength in the drop optical signal.

38. The system as in claim 36, wherein the node transponder further comprises:
- a line-side transmitter to produce the optical add signal to the node add element;
- a client-side receiver to receive a client input signal;
- a line-side receiver comprising an tunable optical filter to select a wavelength of light in the drop optical signal and operating to detect an optical signal at the selected wavelength in the drop signal; and
- a client-side transmitter to send a client output signal, wherein the client side transmitter and the client side receiver are connected to a receiver and a transmitter of the client equipment, respectively.

39. The system as in claim 30, further comprising a protection equipment at a site of each network node in communication with the first and second fiber rings to provide redundancy protection of the network node in communication with the ring network.

40. The system as in claim 39, wherein each network node and a corresponding protection equipment are both coupled to communicate with a common client equipment in communication with the ring network.

41. The system as in claim 40, further comprising:
- an optical coupler to combined client-side optical transmission signals from the network node and the corresponding protection equipment as a client side optical output to the common client equipment; and
- a mechanism to turn off optical transmission from the corresponding protection equipment to the common client equipment when the network node operates normally and to turn on optical transmission from the corresponding protection equipment to the common client equipment when the network node fails to transmit to the common client equipment.

42. The system as in claim 39, wherein each network node and a corresponding protection equipment are respectively coupled to communicate with client working equipment and separate client protection equipment which provides redundancy for the client working equipment in communication with the ring network.

43. The system as in claim 36, wherein the hub switch comprises a first optical switch connected in the first fiber ring and a second optical switch connected in the second fiber ring.

44. The system as in claim 36, wherein the node add element is an optical switch to direct the optical add signal to either one of the pair of add optical couplers.

45. The system as in claim 36, wherein the node add element is an optical coupler to direct the optical add signal to each of the add optical couplers.

46. The system as in claim 36, wherein the node drop element is an optical switch to select one of the drop optical couplers to being connected to the node transponder which receives the drop signal from the selected drop optical coupler.

47. The system as in claim 36, wherein the node drop element is an optical coupler to couple the drop signals from both the drop optical couplers to the node transponder.

* * * * *

UNITED STATES PATENT AND TRADEMARK OFFICE
CERTIFICATE OF CORRECTION

PATENT NO. : 7,499,647 B2
APPLICATION NO. : 10/338088
DATED : March 3, 2009
INVENTOR(S) : Winston I. Way and Chao Xiang Shi It is certified that error appears in the above-identified patent and that said Letters Patent is hereby corrected as shown below:

IN THE CLAIMS:

Column 14, line 39 (Claim 1), after "fibers" insert --at a fixed hub location--;

Column 14, line 45 (Claim 1), delete "fibers." and insert --fibers, the hub switch being separated from the network nodes and operable to open an optical break point at its fixed location independently from operating conditions of neighboring network nodes.--;

Column 14, line 53 (Claim 4), delete "farther" and insert --further--;

Column 15, line 53 (Claim 20), delete "client side" and insert --client-side--;

Column 15, line 54 (Claim 20), delete "client side" and insert --client-side--;

Column 15, line 61 (Claim 20), delete "client side" and insert --client-side--;

Column 15, line 62 (Claim 20), delete "client side" and insert --client-side--;

Column 16, line 18 (Claim 20), after "fibers" insert --at a fixed position--;

Column 16, line 24 (Claim 20), delete "fibers." and insert --fibers, the hub switch being separated from the network nodes and operable to open an optical break point at its fixed location independently from operating conditions of neighboring network nodes.--;

Column 16, line 48 (Claim 24), delete "client side" and insert --client-side--;

UNITED STATES PATENT AND TRADEMARK OFFICE
CERTIFICATE OF CORRECTION

PATENT NO. : 7,499,647 B2
APPLICATION NO. : 10/338088
DATED : March 3, 2009
INVENTOR(S) : Winston I. Way and Chao Xiang Shi It is certified that error appears in the above-identified patent and that said Letters Patent is hereby corrected as shown below:

Column 16, line 49 (Claim 24), delete "client side" and insert --client-side--;

Column 16, line 56 (Claim 24), delete "client side" and insert --client-side--;

Column 16, line 57 (Claim 24), delete "client side" and insert --client-side--;

Column 17, line 21 (Claim 24), after "fibers" insert --at a fixed position--;

Column 17, line 27 (Claim 24), delete "fibers." and insert --fibers, the hub switch being separated from the network nodes and operable to open an optical break point at its fixed location independently from operating conditions of neighboring network nodes.--;

Column 17, line 65 (Claim 28), after "rings" insert --at a fixed position--;

Column 18, line 3 (Claim 28), delete "rings." and insert --rings, the hub switch being separated from the network nodes and operable to open an optical break point at its fixed location independently from operating conditions of neighboring network nodes.--;

Column 18, line 52 (Claim 32), replace both instances of "client side" with --client-side--;

Column 19, line 30 (Claim 36), after "rings" insert --at a fixed position--;

Column 19, line 34 (Claim 36), after "rings" insert --at its fixed position--;

UNITED STATES PATENT AND TRADEMARK OFFICE
CERTIFICATE OF CORRECTION

PATENT NO. : 7,499,647 B2
APPLICATION NO. : 10/338088
DATED : March 3, 2009
INVENTOR(S) : Winston I. Way and Chao Xiang Shi It is certified that error appears in the above-identified patent and that said Letters Patent is hereby corrected as shown below:

Column 19, line 37 (Claim 36), after "rings," insert --and wherein the hub switch is separated from the network nodes and operable to open an optical break point at its fixed location independently from operating conditions of neighboring network nodes,--;

Column 20, line 11 (Claim 38), delete "an" and insert --a--;

Column 20, line 24 (Claim 40), delete "claim 39" and insert --claim 36--;

Column 20, line 58 (Claim 46), delete "couplers to being connected" and insert --couplers being connected--.

Signed and Sealed this

Twenty-sixth Day of May, 2009

JOHN DOLL
*Acting Director of the United States Patent and Trademark Office*